(12) United States Patent
Brack et al.

(10) Patent No.: US 7,615,605 B2
(45) Date of Patent: Nov. 10, 2009

(54) MONOMER SOLUTION FOR PRODUCING POLYCARBONATE

(75) Inventors: Hans-Peter Brack, Herrliberg (CH); Maarten Antoon Jan Campman, Churra-Murcia (ES); Yohana Perez de Diego, Murcia (ES); Dennis James Patrick Maria Willemse, Standdaarbuiten (NL)

(73) Assignee: Sabic Innovative Plastics IP B.V., Bergen op Zoom (NL)

( * ) Notice: Subject to any disclaimer, the term of this patent is extended or adjusted under 35 U.S.C. 154(b) by 0 days.

(21) Appl. No.: 12/234,243

(22) Filed: Sep. 19, 2008

(65) Prior Publication Data

US 2009/0247726 A1 Oct. 1, 2009

Related U.S. Application Data

(63) Continuation-in-part of application No. 12/055,453, filed on Mar. 26, 2008.

(51) Int. Cl.
  *C08G 64/00* (2006.01)
  *C08G 63/02* (2006.01)
(52) U.S. Cl. .................. 528/196; 422/56; 422/57; 422/62; 422/75; 436/75; 436/79; 436/85; 436/95; 436/106; 438/111; 528/198
(58) Field of Classification Search ............... 422/56, 422/57, 62, 75; 436/75, 79, 85, 95, 106, 436/111; 528/196, 198
See application file for complete search history.

(56) References Cited

U.S. PATENT DOCUMENTS

| | | | |
|---|---|---|---|
| 4,323,668 A | 4/1982 | Brunelle | |
| 4,490,519 A | 12/1984 | Kosanovich et al. | |
| 5,091,591 A | 2/1992 | Cipullo | |
| 5,151,491 A | 9/1992 | Sakashita et al. | |
| 5,276,129 A | 1/1994 | Sakashita et al. | |
| 5,525,701 A | 6/1996 | Tominari et al. | |
| 5,696,222 A | 12/1997 | Kaneko et al. | |
| 6,177,536 B1 | 1/2001 | Anamizu et al. | |
| 6,252,036 B1 | 6/2001 | Hatono et al. | |
| 6,300,459 B1 | 10/2001 | Kaneko et al. | |
| 6,303,734 B1 | 10/2001 | Funakoshi et al. | |
| 6,399,739 B1 | 6/2002 | McCloskey et al. | |
| 6,403,754 B1 | 6/2002 | McCloskey et al. | |
| 6,410,678 B1 | 6/2002 | Ishida et al. | |
| 6,410,777 B1 | 6/2002 | Kaneko et al. | |
| 6,417,291 B1 | 7/2002 | Kaneko et al. | |
| 6,420,512 B1 | 7/2002 | McCloskey et al. | |
| 6,420,588 B1 | 7/2002 | McCloskey et al. | |
| 6,469,192 B1 | 10/2002 | Burnell et al. | |
| 6,500,914 B1 | 12/2002 | Brack et al. | |
| 6,506,871 B1 | 1/2003 | Silvi et al. | |
| 6,518,391 B1 | 2/2003 | McCloskey et al. | |
| 6,525,163 B1 | 2/2003 | Brack et al. | |
| 6,548,623 B2 | 4/2003 | Brunelle et al. | |
| 6,590,068 B2 | 7/2003 | Brack et al. | |
| 6,600,004 B1 | 7/2003 | McCloskey et al. | |
| 6,605,686 B2 * | 8/2003 | Takemoto et al. | 528/196 |
| 6,653,434 B2 | 11/2003 | Brack et al. | |
| 6,706,846 B2 | 3/2004 | Brack et al. | |
| 6,710,156 B2 | 3/2004 | Whitney et al. | |
| 6,723,823 B2 | 4/2004 | McCloskey et al. | |
| 6,734,277 B2 | 5/2004 | Brack et al. | |
| 6,747,119 B2 | 6/2004 | Brack et al. | |
| 6,887,970 B2 | 5/2005 | Kratschmer et al. | |
| 6,900,283 B2 | 5/2005 | Ramesh et al. | |
| 7,132,498 B2 | 11/2006 | McCloskey et al. | |
| 2002/0132957 A1 | 9/2002 | Brack et al. | |
| 2002/0183477 A1 | 12/2002 | Takemoto et al. | |
| 2004/0068086 A1 | 4/2004 | Day et al. | |
| 2004/0087756 A1 | 5/2004 | Ramesh et al. | |
| 2005/0143554 A1 | 6/2005 | Dhara et al. | |
| 2005/0234211 A1 | 10/2005 | Martinez et al. | |
| 2006/0069228 A1 | 3/2006 | McCloskey et al. | |
| 2007/0119041 A1 | 5/2007 | Mascarenas et al. | |
| 2007/0135611 A1 | 6/2007 | Brack et al. | |
| 2008/0004379 A1 | 1/2008 | Berndsen et al. | |
| 2008/0004417 A1 | 1/2008 | Jansen et al. | |
| 2008/0004418 A1 | 1/2008 | Jansen et al. | |
| 2009/0088540 A1 | 4/2009 | Brack et al. | |
| 2009/0088549 A1 | 4/2009 | Brack et al. | |

FOREIGN PATENT DOCUMENTS

| | | | |
|---|---|---|---|
| JP | 5009282 A2 | | 1/1993 |
| JP | 06-032886 | * | 2/1994 |
| JP | 10101786 A2 | | 4/1998 |
| JP | 10101787 A2 | | 4/1998 |
| JP | 11302228 A2 | | 11/1999 |
| JP | 2000129112 A | | 5/2000 |
| JP | 2002309015 A2 | | 10/2002 |
| WO | 03040208 A1 | | 5/2003 |
| WO | 03106149 A1 | | 12/2003 |

* cited by examiner

*Primary Examiner*—Terressa M Boykin
(74) *Attorney, Agent, or Firm*—Larson & Anderson, LLC

(57) ABSTRACT

A non-reactive monomer mixture contains a monomer component and a diaryl carbonate dispersed in the mixture. The monomer component includes one or more monomer compounds having a melting point below the melting point of the diaryl carbonate. The monomer component has less than 600 ppb alkali metal, an acid stabilizer, or both less than 600 ppb alkali metal and an acid stabilizer. The monomer compounds of the monomer component and the diaryl carbonate are present in a mole ratio of from 0.9 to 1.1. The monomer mixture is at a temperature between the melting temperature of the lowest melting monomer compound and less than 5° C. above the melting point of the diaryl carbonate.

35 Claims, 15 Drawing Sheets

Influence of Acid Concentration on Inhibiting Conversion in Monomer Solutions

Reactivity: WE 1

Reactivity: WE 1 with Acid addition

Reactivity: WE 3

Reactivity: WE 3 with acid stabilizer

Reactivity: WE 4

Reactivity of the oligomerizations in Working Examples 22-24.

a*, b* and YI values (for 10% m/v solutions) of
the oligomer samples of Working Examples 22-24

Molecular weight, expressed as Mw (PC),
of the polymers prepared in Working Examples 25-28

Color values (YI, a* and b*) of the polymers
prepared in Working Examples 25-28

BPA-OH, Sal-OH and TMSC end groups of the
polymers prepared in Working Examples 25-28

MONOMER SOLUTION FOR PRODUCING POLYCARBONATE

CROSS-REFERENCE TO RELATED APPLICATIONS

The present application is a continuation-in-part of U.S. patent application Ser. No. 12/055,453 filed on Mar. 26, 2008 and is related to U.S. patent application Ser. No. 11/863,659 filed on Sep. 28, 2007, both of which are incorporated herein by reference for all purposes.

BACKGROUND

Polycarbonate is a thermoplastic that has excellent mechanical properties such as impact resistance, heat resistance, and transparency. Polycarbonates are widely used in applications ranging from football helmets to automobile parts to transparent security windows. More recently, polycarbonates have also proven to be the material of choice for optical media applications such as optical discs, for example compact discs (CD) and digital versatile discs (DVD). Conventional polycarbonates are usually produced by (1) an interfacial polymerization, in which bisphenol A (BPA) is reacted directly with phosgene or by (2) a melt polymerization process in which BPA is transesterified with a diaryl carbonate such as diphenyl carbonate (DPC) or an activated diaryl carbonate such as bismethylsalicylcarbonate (BMSC). For many applications, there has been a need for materials possessing the fundamental characteristics of transparency and toughness inherent in BPA polycarbonate but possessing, in addition, certain improvements in physical properties relative to those possessed by bisphenol A polycarbonate (BPA-PC), for example birefringence. For some applications improved chemical resistance relative to BPA polycarbonate is required, for example in certain medical and automotive applications. Copolycarbonates are materials frequently possessing the fundamental traits of BPA polycarbonate, transparency and toughness, but in certain instances also possessing improved performance characteristics for a given application relative to BPA polycarbonate.

Color can be generated in polycarbonates or in copolycarbonates which reduces the transparent quality of resulting articles formed from such. The quality of the starting materials has a large effect on the color of the final polycarbonate. Further, the polymerization and molding conditions used to produce the polycarbonate and molded articles may lead to the formation of side reactions within the polycarbonate leading to color formation therein. It would be beneficial to find a way to improve the color and other properties of polycarbonates.

SUMMARY OF THE INVENTION

The present invention relates to polycarbonate produced by melt transesterification reactions and non-reactive monomer mixtures formed prior to being used in these processes. It has been found that by preparing a non-reactive monomer mixture comprising a diaryl carbonate and a monomer component at a temperature that is less than 40° C. above the melting point of the diaryl carbonate component (e.g. less than 30° C., 20° C., 10° C., 5° C., and even less than the melting point of the diaryl carbonate) one is able to prepare polycarbonates having improved color and less undesired reaction byproducts, particularly those resulting from side reactions of monomers in the oligomerization stage of these processes.

In one embodiment the present invention provides a method of forming a non-reactive monomer mixture that is suitable for use in a melt transesterification reaction to form polycarbonate. The method comprises the steps of:

(i) providing a diaryl carbonate;

(ii) selecting a first monomer compound, wherein the melting point of the first monomer compound is below the melting point of the diaryl carbonate, (iii) performing a monomer conditioning step selected from the group consisting of:
  (a) testing the first monomer compound for the presence of alkali metal prior to forming the non-reactive monomer mixture, and if said alkali metal is present, performing a step selected from the group consisting of:
    (I) treating the first monomer compound to reduce the level of said alkali metal to an amount of less than 600 ppb,
    (II) adding an acid stabilizer to the first monomer compound, and
    (III) a combination of steps (I) and (II), and
  (b) treating the first monomer compound with a step selected from the group of:
    (I) treating the first monomer compound to reduce the level of said alkali metal to an amount of less than 600 ppb,
    (II) adding an acid stabilizer to the first monomer compound, and
    (III) a combination of steps (I) and (II), (iv) adjusting the temperature of the first monomer compound, the diaryl carbonate, or both the first monomer compound and the diaryl carbonate to a first temperature that is:

less than 40° C. above the melting point of the diaryl carbonate; and (v) combining the diaryl carbonate with the first monomer compound, wherein the first temperature is selected such that the diaryl carbonate and the first monomer compound disperse to form the non-reactive monomer mixture.

In a second embodiment another method of forming a non-reactive monomer mixture is provided. The method comprises the steps of:

(i) selecting a first monomer compound and a second monomer compound, wherein the melting point of the second monomer compound is greater than the melting point of the first monomer compound, (ii) adjusting the temperature of the first monomer compound to a first temperature that is:

equal to or above the melting point of the first monomer compound, and less than the melting point of the second monomer compound;

(iii) adding the second monomer compound to the first monomer compound, wherein the first temperature is selected such that the second monomer compound added to the first monomer compound is dispersed in the first monomer compound to produce a non-reactive monomer mixture, and (iv) performing a monomer conditioning step selected from the group consisting of:
  (a) testing the first and second monomer compounds for the presence of alkali metal, and if said alkali metal is present in either or both of the first and second monomer compounds, performing a step selected from the group consisting of:

(I) treating the monomer compounds which have said alkali metal present to reduce the level of said alkali metal to an amount of less than 600 ppb, (II) adding an acid stabilizer to the monomer compounds which have said alkali metal present, and (III) a combination of steps (I) and (II), and (b) treating the first and the second monomer compounds with a step selected from the group of:

(I) treating the monomer compounds to reduce the level of said alkali metal to an amount of less than 600 ppb, (II) adding an acid stabilizer to the monomer compounds, and (III) a combination of steps (I) and (II), thereby forming a non-reactive monomer mixture.

In a third embodiment the present invention provides a non-reactive monomer mixture. The mixture consists of a diaryl carbonate and a second monomer component both dispersed in a melted first monomer compound, wherein:

(I) the diaryl carbonate and the second monomer compound have melting points greater than the melting point of the first monomer compound;

(II) the non-reactive monomer mixture comprises less than 600 ppb alkali metal, an acid stabilizer, or both less than 600 ppb alkali metal and an acid stabilizer;

(III) the mole ratio of the first and second monomer compounds to the diaryl carbonate between 0.9 to 1.1 inclusive; and (IV) the monomer mixture is at a temperature equal to or above the melting point of the first monomer compound and less than 5° C. above the melting point of the diaryl carbonate.

In a fourth embodiment the present invention provides another non-reactive monomer mixture. The non-reactive monomer mixture consists of a monomer component dispersed in a melted diaryl carbonate, wherein the monomer component comprises one or more monomer compounds having a melting point below the melting point of the diaryl carbonate and wherein the monomer component comprises less than 600 ppb alkali metal, an acid stabilizer, or both less than 600 ppb alkali metal and an acid stabilizer, wherein the monomer compounds of the monomer component and the diaryl carbonate are present in a mole ratio of from 0.9 to 1.1, and wherein the monomer mixture is at a temperature between the melting temperature of the lowest melting monomer compound and less than 5° C. above the melting point of the diaryl carbonate.

DETAILED DESCRIPTION

Figure 1:
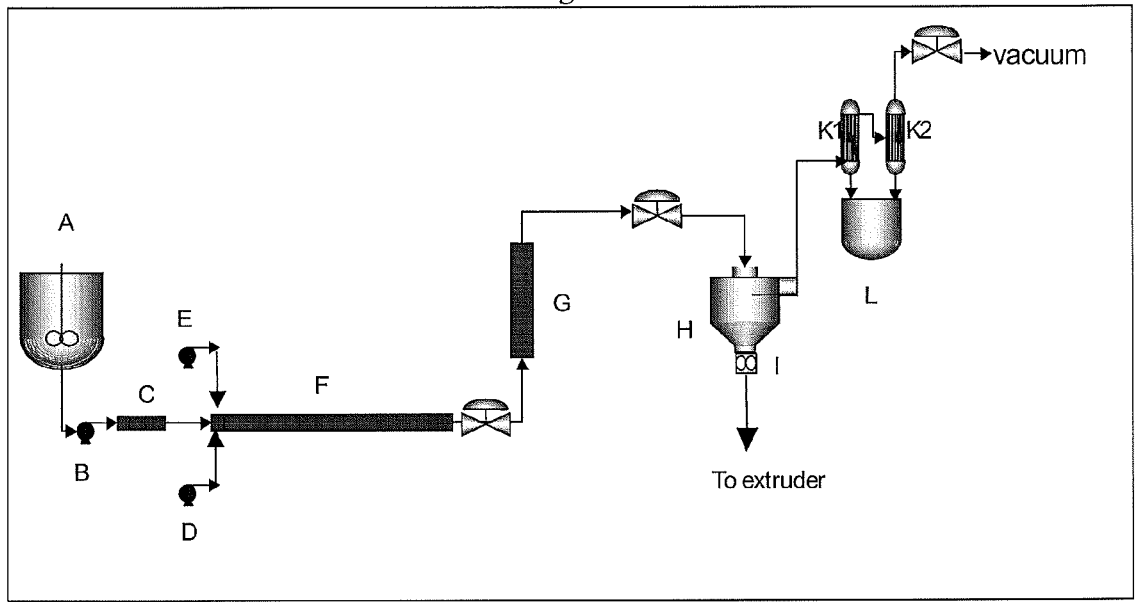
FIG. 1 is a reaction system in accordance with Example 7 provided in the example section.

The present invention may be understood more readily by reference to the following detailed description of preferred embodiments of the invention and the examples included herein. The present invention relates to polycarbonate produced by melt transesterification reactions and to non-reactive monomer mixtures used in these processes. It has been found that polymerizing a non-reactive monomer mixture prepared according to the methods of the present invention, one is able to prepare polycarbonates having improved color among other improved properties. By using the methods of the present invention, the Inventors have found that non-reactive monomer mixtures can be prepared at low temperatures thereby minimizing raw material degradation prior to being used in the polymerization process. Furthermore, the non-reactive monomer mixtures prepared according to the methods of the present invention can be stored for later use and/or transported to polycarbonate production facilities.

DEFINITIONS

As used in the specification and claims of this application, the following definitions, should be applied.

"a", "an", and "the" as an antecedent refer to either the singular or plural. For example, "an aromatic dihydroxy compound" refers to either a single species of compound or a mixture of such species unless the context indicates otherwise.

"polycarbonate" refers to an oligomer or polymer comprising residues of at least one monomer compound (e.g. a dihydroxy compound) joined by carbonate linkages. In certain embodiments of the invention, the polycarbonate comprises residues of an aromatic dihydroxy compound and has a number average molecular weight, Mn, measured relative to polystyrene (PS) standards of between 10,000 g/mol and 160,000 g/mol. In specific embodiments, the Mn measured relative to PS is between 13,000 g/mol and 160,000 g/mol, for example between 15,000 g/mol and 160,000 g/mol. In another embodiment, the Mn (PS) is between 15,000 g/mol and 102,000 g/mol. The term "polycarbonate" encompasses poly(carbonate-coester) oligomers and polymers. Nothing in the description and claims of this application should be taken as limiting the polycarbonate to only one monomer residue unless the context is expressly limiting. Thus, the application encompasses copolycarbonates with residues of 2, 3, 4, or more types of monomer compounds.

"non-reactive monomer mixture" as it is used herein shall be understood to mean that the non-reactive monomer mixture does not substantially react to form byproducts (such as chainstopping byproducts like Sal-OH (e.g. Salicyl-OH), methyl carbonate and methyl ether, and other byproducts such as I-SC (e.g. Internal Salicyl Carbonate), polycarbonate oligomer, and/or polycarbonate polymer prior to being used in a subsequent polymerization process. It is preferred that the non-reactive monomer mixture is maintained at a temperature such that the reaction components are maintained in a dispersed state in the non-reactive monomer mixture. The non-reactive monomer mixture preferably will have less than 600 ppb alkali metal present and/or an acid stabilizer present to inhibit a reaction between the diaryl carbonate and the monomer compound(s). In one embodiment the monomer mixture will react to form polycarbonate polymer or oligomer whilst in the formed non-reactive monomer mixture where less than 15%, more preferably less than 10%, still more preferably less than 5%, and most preferably less than 2% of the diaryl carbonate present in the formed non-reactive monomer mixture is consumed. In another embodiment the monomer mixture will react to form polycarbonate polymer or oligomer whilst in the formed non-reactive monomer mixture where the rate of conversion is less than 5% per hour, preferably less than 1% per hour, more preferably less than 0.5% per hour, and most preferably less than 0.2% per hour. In one embodiment prior to or during formation of the non-reactive monomer mixture the diaryl carbonate and the monomer compound are allowed to partially react.

The terms "monomer compound" and "dihydroxy compound" are used interchangeably herein.

The term "acid stabilizer" as it is used herein shall be understood to mean acidic compounds or their derivatives that quench, inactivate, or deactivate undesirable components such as alkali metals and other catalytically active species and thus stabilize the non-reactive monomer mixture, such as an acid, acid salt, ester of an acid or their combinations.

The term "disperse" as it relates to the creation of the non-reactive monomer mixture (e.g. a reaction component(s) disperses in another reaction component(s)) or the monomer mixture itself is herein understood to mean that the reaction component dissolves, melts, or both dissolves and melts and distributes within another reaction component(s) or monomer mixture.

The term "reactant" and "reaction component" are used interchangeably herein and are herein understood to mean components of the non-reactive monomer mixture. Typical reactants of the non-reactive monomer mixture include a monomer compound (e.g. a dihydroxy monomer compound) and a diaryl carbonate.

The phrase "lowering the temperature of the non-reactive monomer mixture" is herein understood to mean that the temperature of the non-reactive monomer mixture is lowered to a temperature below that "first temperature" the reaction component is adjusted to form the non-reactive monomer mixture. The temperature of the non-reactive monomer mixture may be lowered to a temperature that is above, equal to, or below the melting point of the first monomer component, and/or the diaryl carbonate. For example the temperature of the non-reactive monomer mixture may be lowered to a temperature that is less than 10° C. or less than 5° C. above the melting point of the first monomer component or the diaryl carbonate. In another embodiment, the temperature of the non-reactive monomer mixture is lowered to a temperature that is above the melting point of the first dihydroxy component and between 5° C. and 80° C. (e.g. between 10 and 50° C.) below the melting point of the selected diaryl carbonate. In a preferred embodiment the temperature of the non-reactive monomer mixture is lowered to a temperature wherein the first monomer component, and/or the second monomer component, and/or selected diaryl carbonate if present, are maintained in solution after they have been dispersed. In certain embodiments the temperature of the non-reactive monomer mixture is lowered to a temperature where the non-reactive monomer mixture may become partly solid or completely solid.

The "Lowest Stable Temperature" (LST) is the approximate lowest temperature at which a particular non-reactive monomer mixture composition remains liquid, free-flowing and capable of being mechanically stirred. Typically the LST is about 5° C. above the temperature at which the particular non-reactive monomer mixture either crystallizes, solidifies, or precipitates. The LST is thus the minimum temperature required to maintain a particular non-reactive monomer mixture composition in free-flowing liquid form in which it can be transferred by means of pumps, valves, fluid flow, and gravity.

As used herein the term "Lowest Dispersion Temperature" (LDT) is the lowest temperature of the first reaction component (e.g. first monomer compound or the diaryl carbonate) where the introduced reaction component completely disperses in the first reaction component. In some embodiments the LDT is the lowest temperature of the first monomer compound where the diaryl carbonate or second monomer component completely disperses in the first monomer component. In some other embodiments, the LDT is the lowest temperature of the diaryl carbonate where the first monomer compound disperse in the diaryl carbonate. In other embodiments the term LDT characterizes the lowest dispersion temperature of a mixture of two or more reaction components, for example the LDT of a second monomer component into a mixture of diaryl carbonate and a first monomer component is the lowest temperature the second monomer component disperses in the combined mixture.

Reference throughout the specification to "one embodiment," "another embodiment," "an embodiment," "some embodiments," and so forth, means that a particular element (e.g., feature, structure, property, and/or characteristic) described in connection with the embodiment is included in at least one embodiment described herein, and may or may not be present in other embodiments. In addition, it is to be understood that the described element(s) may be combined in any suitable manner in the various embodiments.

Numerical values in the specification and claims of this application, particularly as they relate to polymer compositions, reflect average values for a composition that may contain individual polymers of different characteristics. Furthermore, unless indicated to the contrary, the numerical values should be understood to include numerical values which are the same when reduced to the same number of significant figures and numerical values which differ from the stated value by less than the experimental error of conventional measurement techniques of the type described in the present application to determine the value.

The Diaryl Carbonate:

In the melt production of polycarbonate, the compounds which react with the monomer compounds to form carbonate linkages (the carbonate source) may be carbonate diesters, carbonyl halides, etc. Specific examples of diaryl carbonates include: diphenyl carbonate, ditolyl carbonate, bis(chlorophenyl) carbonate, m-cresyl carbonate, and dinaphthyl carbonate. Of the various compounds of this type diphenyl carbonate (DPC) is often preferred.

The diaryl carbonate can also be derived from an activated diaryl carbonate or a mixture of an activated diaryl carbonate with a non-activated diaryl carbonate. A preferred activated carbonate of the present invention is an ester-substituted diaryl carbonate such as bismethylsalicylcarbonate (BMSC). However, as used herein the term "activated diaryl carbonate" is defined as a diaryl carbonate which is more reactive than diphenyl carbonate toward transesterification reactions. Such activated diaryl carbonates are of the general formula:

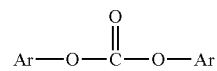

wherein Ar is a substituted aromatic radical having 6 to 30 carbon atoms. The preferred activated diaryl carbonates have the more specific general formula:

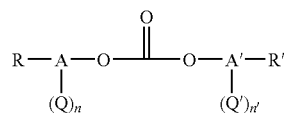

wherein Q and Q' are each independently activating groups. A and A' are each independently aromatic rings which can be the same or different depending on the number and location of their substituent groups, and n or n' are whole numbers of zero up to a maximum equivalent to the number of replaceable hydrogen groups substituted on the aromatic rings A and A', wherein a+a' is greater than or equal to 1. R and R' are each independently a substituent group such as alkyl, substituted alkyl, cycloalkyl, alkoxy, aryl, alkylaryl, cyano, nitro, halogen, and carboalkoxy. The number of R groups is a whole number and can be 0 up to a maximum equivalent to the number of replaceable hydrogen groups on the aromatic rings A minus the number n. The number of R' groups is a whole number and can be 0 up to a maximum equivalent to the number of replaceable hydrogen groups on the aromatic rings A minus the number n'. The number and type of the R and R' substituents on the aromatic ring are not limited unless they deactivate the carbonate and lead to a carbonate which is less reactive than diphenylcarbonate. Typically, the location of the R and R' substituents on the aromatic ring are any one or any combination of the para and/or two ortho positions.

Non-limiting examples of activating groups Q and Q' are: alkoxycarbonyl groups, halogens, nitro groups, amide groups, sulfone groups, sulfoxide groups, imine groups, or cyano groups with structures indicated below:

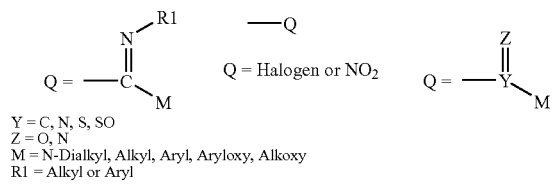

Y = C, N, S, SO
Z = O, N
M = N-Dialkyl, Alkyl, Aryl, Aryloxy, Alkoxy
R1 = Alkyl or Aryl Specific and non-limiting examples of activated carbonates include bismethylsalicylcarbonate, bis(o-chlorophenyl)carbonate, bis(o-nitrophenyl)carbonate, bis(o-acetylphenyl)carbonate, bis(o-phenylketonephenyl)carbonate, bis(o-formylphenyl)carbonate, and bis(o-cyanophenyl)carbonate. Unsymmetrical combinations of these structures, where the substitution number and type on A and A' are different, are also possible to employ in the current invention. A preferred structure for an activated carbonate is an ester-substituted diaryl carbonate having the structure:

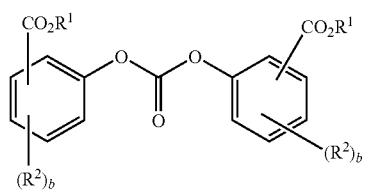

wherein $R^1$ is independently at each occurrence a $C_1$-$C_{20}$ alkyl radical, $C_4$-$C_{20}$ cycloalkyl radical, or $C_4$-$C_{20}$ aromatic radical; $R^2$ is independently at each occurrence a halogen atom, cyano group, nitro group, $C_1$-$C_{20}$ alkyl radical, $C_4$-$C_{20}$ cycloalkyl radical, $C_4$-$C_{20}$ aromatic radical, $C_1$-$C_{20}$ alkoxy radical, $C_4$-$C_{20}$ cycloalkoxy radical, $C_4$-$C_{20}$ aryloxy radical, $C_1$-$C_{20}$ alkylthio radical, $C_4$-$C_{20}$ cycloalkylthio radical, $C_4$-$C_{20}$ arylthio radical, $C_1$-$C_{20}$ alkylsulfinyl radical, $C_4$-$C_{20}$ cycloalkylsulfinyl radical, $C_4$-$C_{20}$ arylsulfinyl radical, $C_1$-$C_{20}$ alkylsulfonyl radical, $C_4$-$C_{20}$ cycloalkylsulfonyl radical, $C_4$-$C_{20}$ arylsulfonyl radical, $C_1$-$C_{20}$ alkoxycarbonyl radical, $C_4$-$C_{20}$ cycloalkoxycarbonyl radical, $C_4$-$C_{20}$ aryloxycarbonyl radical, $C_2$-$C_{60}$ alkylamino radical, $C_6$-$C_{60}$ cycloalkylamino radical, $C_5$-$C_{60}$ arylamino radical, $C_1$-$C_{40}$ alkylaminocarbonyl radical, $C_4$-$C_{40}$ cycloalkylaminocarbonyl radical, $C_4$-$C_{40}$ arylaminocarbonyl radical, or $C_1$-$C_{20}$ acylamino radical; and b is independently at each occurrence an integer from 0 to 4. At least one of the substituents $CO_2R^1$ is preferably attached in an ortho position relative to the carbonate group.

Examples of preferred ester-substituted diaryl carbonates include and are not limited to BMSC (CAS Registry No. 82091-12-1), bis(ethyl salicyl)carbonate, bis(propyl salicyl) carbonate, bis(butylsalicyl) carbonate, bis(benzyl salicyl)carbonate, bis(methyl 4-chlorosalicyl)carbonate and the like. Typically BMSC is preferred for use in melt polycarbonate synthesis due to its lower molecular weight and higher vapor pressure.

One method for determining whether a certain diaryl carbonate is activated or is not activated is to carry out a model transesterification reaction between the certain diaryl carbonate with a phenol such as para-cumyl phenol. This phenol is preferred because it possesses only one reactive site, it possesses a low volatility, and it possesses a similar reactivity to bisphenol A. The model transesterification reaction is carried out at temperatures above the melting points of the certain diaryl carbonate and para-cumyl phenol and in the presence of a transesterification catalyst, which is usually an aqueous solution of sodium hydroxide or sodium phenoxide. Preferred concentrations of the transesterification catalyst are about 0.001 mole % based on the number of moles of the phenol or diaryl carbonate, and a preferred reaction temperature is 200 C. But the choice of conditions and catalyst concentration can be adjusted depending on the reactivity of the reactants and melting points of the reactants to provide a convenient reaction rate. The only limitation to reaction temperature is that the temperature must be below the degradation temperature of the reactants. Sealed tubes can be used if the reaction temperatures cause the reactants to volatilize and effect the reactant molar balance. The determination of the equilibrium concentration of reactants is accomplished through reaction sampling during the course of the reaction and then analysis of the reaction mixture using a well-known detection method to those skilled in the art such as HPLC (high pressure liquid chromatography). Particular care needs to be taken so that reaction does not continue after the sample has been removed from the reaction vessel. This is accomplished by cooling down the sample in an ice bath and by employing a reaction quenching acid such as acetic acid in the water phase of the HPLC solvent system. It may also be desirable to introduce a reaction quenching acid directly into the reaction sample in addition to cooling the reaction mixture. A preferred concentration for the acetic acid in the water phase of the HPLC solvent system is 0.05% (v/v). The equilibrium constant can be determined from the concentration of the reactants and product when equilibrium is reached. Equilibrium is assumed to have been reached when the concentration of components in the reaction mixture reach a point of little or no change on sampling of the reaction mixture. The equilibrium constant can be determined from the concentration of the reactants and products at equilibrium by methods well known to those skilled in the art. A diaryl carbonate which possesses an equilibrium constant of greater than 1 is considered to possess a more favorable equilibrium than diphenylcarbonate and is an activated carbonate, whereas a diaryl carbonate which possesses an equilibrium constant of 1 or less is considered to possess the same or a less favorable equilibrium than diphenylcarbonate and is considered not to be activated. It is generally preferred to employ an activated carbonate with very high reactivity and equilibrium constants compared to diphenylcarbonate when conducting transesterification reactions. Preferred are activated carbonates with an equilibrium constant greater than at least 10 times that of diphenylcarbonate.

Some non-limiting examples of non-activating groups which, when present in an ortho position relative to the carbonate group, would not be expected to result in activated carbonates are alkyl and cycloalkyl. Some specific and non-limiting examples of non-activated carbonates are bis(o-methylphenyl)carbonate, bis(p-cumylphenyl)carbonate, and bis (p-(1,1,3,3-tetramethyl)butylphenyl)carbonate.
Unsymmetrical combinations of these structures are also expected to result in non-activated carbonates.

Unsymmetrical diaryl carbonates wherein one aryl group is activated and one aryl is unactivated or de-activated would also be useful in this invention if the activating group renders the diaryl carbonate still more reactive than diphenyl carbonate.

The theoretical stoichiometry of the reaction within the melt polymerization reaction mixture requires a molar ratio of monomer composition to diaryl carbonate composition of 1:1. However, in practicing the present invention the molar ratio in the melt reaction mixture is suitably between 0.25:1 to 3:1, more preferably 1:0.95 to 1:1.05 and more preferably 1:0.98 to 1:1.02. In one embodiment, the mole ratio of total moles of monomer components (e.g. the first and second monomer components) to the moles of the selected diaryl carbonate is equal to or between 0.9 to 1.1.

The following table illustrates representative melting points of non-limiting examples of suitable diaryl carbonates for use with the present invention.

Representative Melting Points of Diaryl Carbonates first monomer compound and in some case greater than the selected diaryl carbonate. In another embodiment, the methods of the present invention include the addition of a second or third monomer component that have melting points below the melting point of the first monomer component.

In yet another embodiment, the present invention includes the preparation of a non-reactive monomer mixture having a first monomer component and a second monomer component present where the second monomer component has a higher melting point than the first monomer component. In this embodiment it is sometimes preferable that the non-reactive monomer mixture is prepared in the absence of diaryl carbonate and stored for a period of time exceeding 1 hour prior to the introduction of diaryl carbonate to the mixture. In this embodiment the diaryl carbonate is preferably added to the non-reactive monomer mixture, no more than 2 hours for example less than an hour prior to introducing the combined mixture to a melt polymerization reaction system.

The monomer compounds are not limited to dihydroxy compounds or to aromatic dihydroxy compounds. For example, preferred monomer compounds include compounds having one or more functional groups capable of reacting with a dihydroxy compound or a diaryl carbonate to give a chemical bond. Some non-limiting examples of such reactive functional groups are carboxylic acid, ester, amine functional groups and their combinations. Typical monomer compounds will have two functional groups capable of react-

| Carbonate | Structure | Melting Point (° C.) |
|---|---|---|
| Diphenyl carbonate | | 78-79 |
| Ditolyl carbonate | | 89-90 |
| Bis-4-nitrophenyl carbonate | | 136-142 |
| Bismethyl salicyl carbonate | | 110-115 |

The Monomer Compound:

In certain embodiments the methods of the present invention include the step of selecting a first monomer compound that has a melting point below the melting point of the selected diaryl carbonate for incorporation into the non-reactive monomer mixture. In some embodiments another monomer compound (e.g. a second monomer compound) or compounds are selected for incorporation into the non-reactive monomer mixture wherein the additional monomer(s) have melting points that are greater than the melting point of the ing with a dihydroxy compound or a diaryl carbonate; however monofunctional compounds may be used as chainstoppers or endcappers, and trifunctional or higher functional compounds may be used as branching agents. However, dihydroxy and aromatic dihydroxy compounds are frequently preferred for use in these types of applications. Suitable dihydroxy compounds and dihydroxy aromatic compounds are those as described in U.S. patent application Ser. No. 11/863,659 which as incorporated herein by reference for all purposes.

A non-limiting list of suitable monomer compounds having lower melting points compared to a preferred diaryl carbonate, BMSC (with a melting point of about 110-115° C.), are selected from the group consisting of: isosorbide, ethylene glycol, 1,3-Propanediol, 1,2-Propanediol, 1,4-Butanediol, 1,3-Butanediol, 1,5-Pentanediol, 1,6-Hexanediol, 1,7-Heptanediol, 1,10-Decanediol, 1,2-Cyclohexanediol, trans-1,2-Cyclohexanediol, cis-1,2-Cyclohexanediol, 1,4-Cyclohexanedimethanol, $C_{36}$ branched fatty diol, and 1,2,6-Hexanetriol. These compounds have the structures and melting points (Mp), measured in ° C., as described in the following tables.

| Name | Structure | Mp |
|---|---|---|
| Ethylene glycol | | −13 |
| 1,3-Propanediol | | −32 |
| 1,2-Propanediol | | −60 |
| 1,4-Butanediol | | 20 |
| 1,3-Butanediol | | −54 |
| 1,5-Pentanediol | | −18 |
| 1,6-Hexanediol | | 40-43 |
| 1,7-Heptanediol | | 17-19 |
| 1,10-Decanediol | | 71-75 |
| 1,2-Cyclohexanediol | | 73-77 |
| trans-1,2-Cyclohexanediol | | 100-104 |
| cis-1,2-Cyclohexanediol | | 98-101 |
| 1,4-Cyclohexanedimethanol | | 31.5 |
| 1,2,6-Hexanetriol | | 25-32 |
| 4-Cumylphenol | | 72-75 |

| Name | Structure | Mp |
|---|---|---|
| 1,4-Diaminobutane | $H_2N-(CH_2)_4-NH_2$ | 27 |
| Glutaric anhydride | (cyclic glutaric anhydride structure) | 46-57 |
| Pluronics (polypropylene glycol block copolymer) | $HO(CH_2CH_2O)_x(CHCH_2O)_y(CH_2CH_2O)_zH$ with $CH_3$ branch | −30-48 |
| Isosorbide | (bicyclic isosorbide structure with HO and OH groups) | 62-64 |
| C36 Dimer acid, hydrogenated | (branched structure with indices m, n, o, p); m + n + o + p = 30 C - atoms | <0 |
| C36 branched Fatty diol | (branched structure with indices m, n, o, p); m + n + o + p = 30 C - atoms | <0 |

In one embodiment the selected diaryl carbonate comprises BMSC and the first monomer component comprises a compound selected from the group consisting of: isosorbide, ethylene glycol, 1,3-Propanediol, 1,2-Propanediol, 1,4-Butanediol, 1,3-Butanediol, 1,5-Pentanediol, 1,6-Hexanediol, 1,7-Heptanediol, 1,10-Decanediol, 1,2-Cyclohexanediol, trans-1,2-Cyclohexanediol, cis-1,2-Cyclohexanediol, 1,4-Cyclohexanedimethanol, $C_{36}$ branched fatty diol, 1,2,6-Hexanetriol, resorcinol, block copolymers based on ethylene oxide and propylene oxide, and ethoxylate polymers. Non-limiting examples of block copolymers based on ethylene oxide and propylene oxide include polymers sold under the brand name PLURONIC® (e.g. PLURONIC® PE 3500 and PLURONIC® PE 6100). Non-limiting examples of ethoxylate polymers include polymers sold under the UNITHOX® brand name (e.g. UNITHOX® 480 ETHOXYLATE). Isosorbide is frequently preferred as the first monomer component.

In the embodiment where a further monomer component having a higher melting point than that of the first monomer component is also incorporated into the non-reactive monomer mixture, the latter monomer compound is not particularly limited. This further monomer component may have a melting point below, equal to, or above the melting point of the selected diaryl carbonate. A non-limiting list of suitable monomer compounds having higher melting points compared to the first monomer compound are those as described in U.S. patent application Ser. No. 11/863,659, mentioned above. BPA is frequently preferred as a further (e.g. second) monomer component.

Furthermore, in the embodiment where a monomer compound (e.g. a third monomer component) having a lower melting point than that of the first monomer component is also incorporated into the non-reactive monomer mixture, the latter monomer compound is not particularly limited. In certain embodiments this "third" monomer component is suitably selected from the group consisting of $C_{36}$ diacid, $C_{36}$ diol, dodecanedioic acid, and sebacic acid. In particularly preferred embodiments the present Inventors have found that a preferred composition of the reaction mixture comprises isosorbide as the first monomer component and BPA and/or $C_{36}$ diol and/or $C_{36}$ diacid as the second and third monomer components while the selected diaryl carbonate comprises BMSC.

The Phenolic Compound

As a melt reaction proceeds using a diaryl carbonate and monomer compound to form polycarbonate, the diaryl carbonate is consumed and a phenolic by-product is generated. The phenolic by-product is typically removed from the reaction system to drive the polymerization reaction toward higher conversion. The structure of the phenolic by-product will depend on what diaryl carbonate is employed as the carbonate source and thus can be an ester-substituted phenol or a non-ester-substituted phenol. For example, if a diaryl carbonate such as diphenyl carbonate (DPC) is employed, a typical phenolic by-product will be a non-ester-substituted phenol, such as phenol. If an activated diaryl carbonate (i.e. ester substituted diaryl carbonate) such as bismethylsalicylcarbonate (BMSC) is employed, a typical phenolic by-product will be an ester-substituted phenol such as methyl salicylate.

It is believed that a higher concentration of the phenolic compound in the reaction mixture will lead to slower polymerization rates in the mixture. It is also believed that the addition of a phenolic compound to the non-reactive monomer mixture will aid in delaying the polymerization reaction, aid in minimizing sublimation and/or devolatilization of monomer compounds out of solution, and increase solubility of many monomer compounds. Further, it is believed that the addition of the phenolic compound will also aid in maintaining the components in solution and prevent them from crystallizing out of solution. Thus in another embodiment of the present invention the method further comprises the addition of a phenolic compound to the diaryl carbonate, the monomer compound(s), or both. Non-limiting examples of other suitable phenolic compounds are found in U.S. application Ser. No. 11/275,110 filed on Dec. 12, 2005 which is incorporated herein by reference for all purposes.

The Acid Stabilizer:

It has also been found that the polymerization reaction can be further inhibited and/or delayed by the addition of an acid stabilizer to the non-reactive monomer mixture. The particular acid stabilizer is not particularly limited. Suitable acid stabilizers include acids, acid salts, esters of acids or their combinations. The addition of the acid or its salt or ester often deactivates catalytically active species such as alkali metals. Particularly useful classes of acids, acid salts and esters of acids are those derived from a phosphorous containing acid such as phosphoric acid, phosphorous acid, hypophosphorous acid, hypophosphoric acid, phosphinic acid, phosphonic acid, metaphosphoric acid, hexametaphosphoric acid, thiophosphoric acid, fluorophosphoric acid, difluorophosphoric acid, fluorophosphorous acid, difluorophosphorous acid, fluorohypophosphorous acid, fluorohypophosphoric acid or their combinations. In one embodiment a combination of a phosphorous containing acid and an ester of a phosphorous containing acid is used. Alternatively, acids, acid salts and esters of acids, such as, for example, sulphuric acid, sulphites, mono zinc phosphate, mono calcium phosphate, and the like, may be used. However, in some embodiments it has been found that the addition of a phosphorus containing acid (e.g. $H_3PO_4$) improves properties including color properties of polycarbonate. Other suitable and non limiting examples of phosphorus containing acids and additional benefits of adding the phosphorus containing acid on the resulting polycarbonate can be found below in the example section and in U.S. patent application Ser. Nos. 11/863,659 and 11/688,551, which are incorporated herein by reference.

Forming the Non-Reactive Monomer Mixture:

In one embodiment the present invention provides a method of forming a non-reactive monomer mixture that is suitable for use in a melt transesterification reaction to form polycarbonate. In this first embodiment, the method comprises the steps of:

(i) providing a diaryl carbonate;

(ii) selecting a first monomer compound, wherein the melting point of the first monomer compound is below the melting point of the diaryl carbonate, (iii) performing a monomer conditioning step selected from the group consisting of:
  (a) testing the first monomer compound for the presence of alkali metal prior to forming the non-reactive monomer mixture, and if said alkali metal is present, performing a step selected from the group consisting of:
    (I) treating the first monomer compound to reduce the level of said alkali metal to an amount of less than 600 ppb,
    (II) adding an acid stabilizer to the first monomer compound, and
    (III) a combination of steps (I) and (II), and
  (b) treating the first monomer compound with a step selected from the group of:
    (I) treating the first monomer compound to reduce the level of said alkali metal to an amount of less than 600 ppb,
    (II) adding an acid stabilizer to the first monomer compound, and
    (III) a combination of steps (I) and (II), (iv) adjusting the temperature of the first monomer compound, the diaryl carbonate, or both the first monomer compound and the diaryl carbonate to a first temperature that is:

less than 40° C. above the melting point of the diaryl carbonate; and (v) combining the diaryl carbonate with the first monomer compound, wherein the first temperature is selected such that the diaryl carbonate and the first monomer compound disperse to form the non-reactive monomer mixture.

It is preferred that the method steps occur in the order listed (i.e. steps i, ii, iii, iv, and then v,). However, it is herein contemplated that steps can occur out of order. For example in some embodiments the method is accomplished by performing the steps in an order selected from the group consisting of: (i), (ii), (iii), (iv), and then (v); (i), (ii), (iii), (v), and then (iv); (i), (ii), (iv), (v), and then (iii); and (i), (ii), (v), (iv), and then (iii).

The present embodiment includes the option of heating either the first monomer compound or the diaryl carbonate to a temperature that is less than 40° C. above the melting point of the diaryl carbonate (e.g. less than 30° C., 20° C., 10° C., and more preferably less than 5° C. above them melting point of the diaryl carbonate and sometimes even more preferred less than the melting point of the diaryl carbonate) and then adding the other reactant. In another option, the first monomer component and the diaryl carbonate are combined and then the combination is heated to the specified temperature.

Along these lines, in one embodiment, step (iv) is performed by adjusting the temperature of the first monomer compound to a first temperature that is less than 40° C. above the melting point of the diaryl carbonate, and step (v) is performed by adding the diaryl carbonate to the molten first monomer compound (e.g. when the first monomer component is a melt) wherein the first temperature is selected such that the diaryl carbonate is dispersed in the first monomer compound to produce the non-reactive monomer mixture. In the present embodiment it is preferred that the diaryl carbonate is at a temperature in a range between 10° C. and 40° C. (e.g. between 20° C. and 30° C., for example at room temperature) when it is added to the first monomer compound. In a separate embodiment, step (iv) is performed by adjusting the temperature of the diaryl carbonate to a first temperature that is less than 40° C. above the melting point of the diaryl carbonate, and step (v) is performed by adding the first monomer compound to the diaryl carbonate, wherein the first temperature is selected such that the first monomer compound is dispersed in the diaryl carbonate to produce the non-reactive monomer mixture. In the present embodiment the first monomer compound is preferably at a temperature in a range between 10° C. and 40° C. (e.g. between 20° C. and 30° C. for example at room temperature) when it is added to the diaryl carbonate. In a further embodiment, the temperature of the formed non-reactive mixture may be lowered and the mixture may be stored for a period of time exceeding one hour (e.g. between 1 and 24 hours).

As described above, in some cases it has been found to be preferable to prepare a non-reactive monomer mixture comprising two or more dihydroxy monomer compounds prior to the addition of diaryl carbonate to the non-reactive monomer mixture. In the present embodiment, the method comprises the steps of:

(i) selecting a first monomer compound and a second monomer compound, wherein the melting point of the second monomer compound is greater than the melting point of the first monomer compound, (ii) adjusting the temperature of the first monomer compound to a first temperature that is:

equal to or above the melting point of the first monomer compound, and less than the melting point of the second monomer compound;

(iii) adding the second monomer compound to the first monomer compound, wherein the first temperature is selected such that the second monomer compound added to the first monomer compound is dispersed in the first monomer compound to produce a non-reactive monomer mixture, and (iv) performing a monomer conditioning step selected from the group consisting of:

(a) testing the first and second monomer compounds for the presence of alkali metal, and if said alkali metal is present in either or both of the first and second monomer compounds, performing a step selected from the group consisting of:

(I) treating the monomer compounds which have said alkali metal present to reduce the level of said alkali metal to an amount of less than 600 ppb, (II) adding an acid stabilizer to the monomer compounds which have said alkali metal present, and (III) a combination of steps (I) and (II), and (b) treating the first and the second monomer compounds with a step selected from the group of:

(I) treating the monomer compounds to reduce the level of said alkali metal to an amount of less than 600 ppb, (II) adding an acid stabilizer to the monomer compounds, and (III) a combination of steps (I) and (II)

thereby forming a non-reactive monomer mixture.

Similar to the methods described above the steps can occur out of the listed order. For example in one embodiment, the method is accomplished by performing step (iv) before or after either or both of steps (ii) or (iii). Furthermore, the method can be accomplished by performing step (ii) either before or after step (iii).

In another embodiment the present method further comprises the steps of:

(v) selecting a diaryl carbonate for use in said melt transesterification reaction; wherein the melting point of the first monomer compound is below the melting point of the selected diaryl carbonate, (vi) adjusting the temperature of the first monomer compound to a second temperature, wherein the second temperature is equal to or above the melting point of the first monomer compound and less than 40° C. above the melting point of the selected diaryl carbonate, and (vii) adding the selected diaryl carbonate to the first monomer compound, wherein the first temperature is further selected such that the selected diaryl carbonate added to the first monomer compound is dispersed in the first monomer compound to produce a non-reactive monomer mixture. In another embodiment the present method is accomplished by performing steps (i) to (iv) prior to steps (v) to (vii), wherein the method further comprises the steps performed after steps (i) to (iv) and prior to steps (v) to (vii) of lowering the temperature of the non-reactive monomer mixture, and storing the non-reactive monomer mixture for a period of greater than one hour (e.g. between 1 and 24 hours).

Alkali metals (e.g. lithium, sodium, potassium, and the like) are known to be impurities in several monomer compounds and especially in dihydroxy compounds. They can be present individually or combined as salts or as some other structures with other chemicals. Alkali metals can act as a catalyst to the polymerization reaction. To reduce the tendency of the reaction mixture to react, embodiments of the present invention include a monomer conditioning step of testing and treating or simply treating the monomer compound to reduce alkali metal to a level of less than 600 ppb or adding an acid stabilizer to the monomer, or a combination of the two treatment steps. It is believed that when the alkali metal has a presence of less than 600 ppb, more preferably less than 400 ppb, for example less that 200 ppb, or where an acid stabilizer is present that its catalytic effect can be minimized. Where the monomer component is tested for the presence of the alkali metal, the testing mechanism is not particularly limited and can be accomplished by known methods of determining concentration of the alkali metal. Non-limiting methods for measuring trace levels of alkali metals include Inductively Coupled Plasma (ICP) Atomic Emission Spectroscopy (AES), Inductively Coupled Plasma (ICP) MassSpectroscopy (MS), Ion Chromatography (IC), electrochemical voltametric analysis, Atomic Absorption Spectroscopy (AAS), and X-ray fluorescence. In a preferred embodiment measurement of trace levels of alkali metals occurs by using Inductively Coupled Plasma (ICP) Atomic Emission Spectroscopy (AES).

The step of testing preferably occurs at the location of formation of the non-reactive monomer mixture. However, the step of testing may be performed "offsite", for example at the monomer's production facility or somewhere in between for example at a third party certification agency, laboratory, or warehouse where the product is tested and assigned an alkali metal grading value. In this later embodiment where the monomer is assigned the alkali metal grading value "offsite", the formation of the non-reactive monomer mixture will proceed based on the assigned alkali metal grading value of the monomer selected for the formation of the non-reactive monomer mixture. For example where a monomer is assigned an alkali metal grading value of less than 600 ppb alkali metal at an off-site location (e.g. a third party chemical supplier), that monomer may be ordered from the supplier and used in the production of the non-reactive monomer mixture and such use falls within the scope of the step "testing the monomer compound for the presence of alkali metal prior to forming the non-reactive monomer mixture". The step of treating the monomer compound(s) to reduce alkali metal level likewise is not particularly limited and can occur by known purification methods such as washing and/or distillation. The step of testing and/or treating the monomer component may occur before, during, or after the formation of the non-reactive monomer mixture.

It is believed that the addition of the acid stabilizer also aids in hindering the catalytic effect of the alkali metal and hence in delaying the transesterification reaction to form polycarbonate oligomer and polymer. In one example, the acid stabilizer is added to the monomer component by itself or when it is combined with other reactants. Where the acid stabilizer is added, the addition mechanism is not particularly limited and may be accomplished by known methods of adding additives. The step of adding the acid stabilizer preferably occurs at the location of formation of the non-reactive monomer mixture. However, the step of adding the acid stabilizer may be performed "offsite", for example at the monomer's production facility or somewhere in between for example at a third party toll manufacturer where the acid stabilizer is added to a monomer component in a specified amount. In this later embodiment where the acid stabilizer is added to the monomer component "offsite", the formation of the non-reactive monomer mixture will proceed based on the specified acid stabilizer level of the monomer selected for the formation of the non-reactive monomer mixture. For example where a monomer is specified to have a content of acid stabilizer of between 0.1 and 200 ppm at an off-site location (e.g. a third party chemical supplier), that monomer may be ordered from the supplier and used in the production of the non-reactive monomer mixture and such use falls within the scope of the step "adding an acid stabilizer to the second monomer compound".

In one embodiment the amount of acid stabilizer added is in an amount such that it is present in the non-reactive monomer mixture between 0.1 and 250 ppm, in other embodiments it is between 1 and 100 ppm. The preferred amount of acid stabilizer on a weight basis (ppm) will depend on factors such as the molecular weight, number of acidic protons per molecule, thermal stability and volatility of the acid stabilizer. The preferred amount will also depend on the temperature of the non-reactive monomer mixture and the amount of basic and/or catalytic impurity species contained in it. For example, adding high amounts of acid stabilizer or adding it repeatedly as a function of time may be used to compensate for loss of the acid stabilizer.

Some monomers such as those imparting high heat stability properties like phenolphtbanilide, a.k.a. 2-Phenyl-3,3-Bis (4-Hydroxyphenyl) Phthalimidine (i.e. PPP-BP, CAS # 6607-41-6), may have enhanced solubility if they are first allowed to partially react with the diaryl carbonate. In this case, it may be advantages to prepare the monomer solution without the acid stabilizer being present, optionally in the presence of added catalyst, and then adding an acid stabilizer after all of the monomers are dissolved in order to convert the monomer mixture into a non-reactive monomer mixture.

In some embodiments of the methods of the present invention, the reactants (e.g. dihydroxy monomer compound(s) and diaryl carbonate where applicable) are added at room temperature to a stirred vessel. In this embodiment the reactants may be in solid form depending upon their melting points. The vessel, including the reactants, is heated to a temperature that is less than 40° C. above the melting point of the diaryl carbonate and the reactants are allowed to disperse to form the non-reactive monomer mixture.

In another embodiment the first monomer compound is added (e.g. as a solid or liquid depending on the temperature) to a stirred vessel. The temperature of the vessel, and the first monomer compound, are adjusted to a temperature less than 40° C. above the melting point of the diaryl carbonate to provide a molten first monomer component. The temperature of vessel and the first monomer compound are at a temperature less than 40° C. above the melting point of the diaryl carbonate, more preferably less than 10° C. above (e.g. less than 5° C. above) the melting point of the diaryl carbonate, and in some embodiments less than the melting point of the diaryl carbonate. The diaryl carbonate is then added to the molten first monomer component where it disperses to form a non-reactive monomer mixture.

In yet another embodiment the diaryl carbonate is added to a stirred vessel. The temperature of the vessel, and the diaryl carbonate, are adjusted to a temperature less than 40° C. above the melting point of the diaryl carbonate to provide a molten diaryl carbonate. The temperature of the vessel and the diaryl carbonate are at a temperature less than 40° C. above the melting point of the diaryl carbonate, more preferably less than 10° C. above (e.g. less than 5° C. above) the melting point of the diaryl carbonate, and in some embodiments less than the melting point of the diaryl carbonate. The first monomer component is then added to the molten diaryl carbonate where it disperses to form the non-reactive monomer mixture. Other modes of combining the reactants to form the non-reactive monomer mixtures are easily contemplated and these modes of creating the non-reactive monomer mixtures do not depart from the scope of the present invention.

In one embodiment the above mentioned processes occurs in a batch-type process where the total amount of reactants (e.g. monomer components and diaryl carbonate if present in the non-reactive monomer mixture) are determined and measured prior to forming the non-reactive mixture and that the process occurs to produce a predetermined amount of non-reactive monomer mixture as a feedstock for a subsequent polymerization run.

In yet another preferred embodiment it is possible to produce a non-reactive monomer mixture continuously where the method further comprises the step of continuously drawing off a non-reactive monomer mixture. The steps of the methods of the present invention can be performed either continuously or semi-continuously at various stages. In the continuous production mode it may be difficult to maintain a constant molar ratio of reactants and care should be taken to ensure desired molar ratios in the resulting monomer mixture.

Where diaryl carbonate is present in the non-reactive monomer mixtures, the total amount of monomer components and the amount of diaryl carbonate are preferably present in a molar ratio (moles monomer/mole diaryl carbonate) of between 0.8 to 1.2, and more preferably between 0.9 and 1.1. In another embodiment a further monomer compound is added to the non-reactive monomer mixture, where the further monomer compound has a melting point below that of the first monomer component. In this embodiment, the further monomer component is added at any point during the formation of the non-reactive monomer mixture. However, it is preferred that a scheme be developed where the second, third, or more monomer components are added to the first monomer component where the higher melting monomers are added prior to the lower melting monomers.

In another embodiment after the non-reactive monomer mixture has been prepared the temperature of the monomer mixture may be lowered toward or below the melting point temperature of the lowest melting monomer (e.g. typically the first monomer component) and stored for more than 1 hour, for example 12 hours or more than 24 hours or more. In a preferred embodiment this time period is often between 1 and 6 hours, inclusive. In this embodiment it is preferred that the temperature is lowered to a temperature that is 5 or more degrees above the LST, for example 10, 15, or 20 degrees above LST on the prepared non-reactive monomer mixture. In one embodiment, the temperature of the non-reactive monomer mixture is maintained at a temperature of between 120° C. and 150° C. and stored for a period of from 0.5 to 24 hours (e.g. between 0.5 to 8 hours) or more. In another embodiment the temperature of the non-reactive monomer mixture is lowered to a temperature where the non-reactive monomer mixture becomes partly or completely solid. In this embodiment, the non-reactive monomer mixture may be lowered to a temperature below 100° C. or to or below room temperature. This non-reactive monomer mixture may be stored, transported, and subsequently used in a melt transesterification reaction. Such amorphous solidified non-reactive monomer mixtures are surprisingly stable and generally can be remelted at temperatures between the LST and the LDT.

The step of lowering the temperature of the non-reactive monomer mixture may be accompanied with the addition of further monomer compounds to the non-reactive monomer mixture. In this embodiment a first monomer compound is selected, wherein the first monomer component requires a higher temperature to disperse in the mixture than does the later added monomer compound. After preparing a non-reactive monomer mixture containing the first monomer component and another reactant (e.g. a diaryl carbonate) at a first temperature, the non-reactive monomer mixture is lowered to a second temperature sufficiently high to maintain the reactants dispersed in the monomer mixture and to permit dissolution of the later added reactant. The second temperature being above the LST of the monomer mixture prior to its addition. The later reactant is added to the mixture at the second temperature and it disperses thereby forming a non-reactive monomer mixture further comprising the later added reactant. The temperature of this mixture may again be dropped toward or below the LST of the mixture as described above. In a preferred embodiment the later added reactants are treated similarly to earlier added monomer components where they are tested and treated or simply treated to either reduce the alkali metal concentration or to add an acid stabilizer.

In another embodiment the method of forming a non-reactive monomer mixture may further comprise the step of adding a phenolic compound to the diaryl carbonate. It is believed that the addition of the phenolic compound will help to maintain the mixture in a non-reactive state since the rate of the polymerization reaction is largely dependent upon presence of the phenolic by-product. The addition of the phenolic compound may occur before, during, or after the formation of the non-reactive monomer mixture. In one embodiment it has been found that the presence of the phenolic compound (e.g. methyl salicylate), helps to curb the transesterification reaction thereby aiding in the prevention of substantial polymerization of the non-reactive monomer mixture and, in some cases, to act as a (co)solvent for the monomers. Furthermore, the addition of the phenolic compound has been found to minimize crystallization of the monomer within the mixture or on surfaces of the preparation vessel. In a preferred embodiment, the phenolic compound is added such that its concentration is between 0.1 and 40 weight % of the total weight of the monomer components in the non-reactive monomer mixture, for example between 0.2 and 30 weight %, and more preferably in a weight % of between 2 and 25. As described above, if the diaryl carbonate employed is bismethylsalicylcarbonate (BMSC) the preferred phenolic compound for addition is the degradation by-product of BMSC (i.e. methyl salicylate) as compared to phenol for systems using DPC as the diaryl carbonate, where the preferred phenolic compound is phenol.

The Non-Reactive Monomer Mixture

The present invention also provides non-reactive monomer mixtures that are suitable for use in a polymerization reaction to form polycarbonate. In a first embodiment, the mixture consists of a diaryl carbonate and a second monomer compound both dispersed in a melted first monomer compound, wherein:

(I) the diaryl carbonate and the second monomer compound have melting points greater than the melting point of the first monomer compound;

(II) the non-reactive monomer mixture comprises less than 600 ppb alkali metal, an acid stabilizer, or both less than 600 ppb alkali metal and an acid stabilizer;

(III) the mole ratio of the first and second monomer compounds to the diaryl carbonate between 0.9 to 1.1 inclusive; and (IV) the monomer mixture is at a temperature equal to or above the melting point of the first monomer compound and less than 5° C. above the melting point of the diaryl carbonate.

The monomer components as well as the diaryl carbonate are suitably those as described above. In certain embodiments, the weight of the first monomer component is greater than the weight of the second monomer component in the non-reactive monomer mixture. For example in one embodiment the weight of the first monomer component is at least 25% more, or at least 50% or more (e.g. 75%, 80%, 100%, or 200%, or more), than the weight of the second monomer component in the non-reactive monomer mixture.

In another embodiment, the mixture consists of a monomer component dispersed in a melted diaryl carbonate, wherein the monomer component comprises one or more monomer compounds having a melting point below the melting point of the diaryl carbonate and wherein the monomer component comprises less than 600 ppb alkali metal, an acid stabilizer, or both less than 600 ppb alkali metal and an acid stabilizer, wherein the monomer compounds of the monomer component and the diaryl carbonate are present in a mole ratio of from 0.9 to 1.1, and wherein the monomer mixture is at a temperature between the melting temperature of the lowest melting monomer compound and less than 5° C. above the melting point of the diaryl carbonate.

In one embodiment the non-reactive monomer mixture comprises phosphorus containing acid as the acid stabilizer. This non-reactive monomer mixture can then be stored for later use or transport to a polycarbonate production facility. The non-reactive monomer mixture can be preferably stored subject to above, at a temperature less than 200° C., more preferably less than 180° C., 170° C., 160° C. and most preferably less than 150° C., for example at room temperature and/or as a solid.

Forming Polycarbonate from the Non-Reactive Monomer Mixture:

The non-reactive monomer mixture described in any of the embodiments as described above may be used in the formation of polycarbonate in a subsequent melt polymerization reaction. In one embodiment, a non-reactive monomer mixture prepared by combining two or more dihydroxy monomer compounds in the absence of a diaryl carbonate can be used where a diaryl carbonate and a melt transesterification catalyst are added to form melt polymerization reaction mixture for use in the polymerization reaction. Where the non-reactive monomer mixture comprises diaryl carbonate a melt polymerization reaction mixture may be formed by adding a catalyst and allowing the mixture to react under melt polymerization conditions. Melt polymerization reactions that create the transesterification between the free hydroxyl ends of dihydroxy compounds with the carbonate source are known and are not particularly limited with respect to the present invention. For example, U.S. patent application Ser. Nos. 11/863,659, 11/427,861, and 11/427,885, which are incorporated herein by reference for all purposes, disclose preferred processes and catalysts for the melt production of polycarbonate.

EXAMPLES

Having described the invention in detail, the following examples are provided. The examples should not be considered as limiting the scope of the invention, but merely as illustrative and representative thereof.

(WE) as used herein is understood to mean "working example" while (CE) is understood to mean "comparative example". The terms "working" and "comparative" are simply used to demonstrate comparisons to other examples. A comparative example may or may not be an example within the scope of the present invention. CSTR stands for continuous flow stirred-tank reactor.

Examples 1-4 are Examples as described in U.S. patent application Ser. No. 12/055,453 filed on Mar. 26, 2008, which is incorporated herein by reference for all purposes.

Example 1

Preparation and Properties of Various Non-Reactive Monomer Mixtures Having Monomer Compounds with Melting Points Above that of the Selected Diaryl Carbonate The melting point of certain desirable monomer compounds, used in melt polymerization processes to produce polycarbonate, is often higher than that of the desired diaryl carbonate compound. For example, the melting point of BPA is about 158° C. and that of BMSC is about 109° C. However, the melting points of other desirable monomer compounds is less than that of the desired diaryl carbonate. For example the melting point of isosorbide (IS) is about 60-70° C. Prior to the present invention, to prepare monomer mixtures one would melt all monomers and diaryl carbonate together by combining the components and heating to the highest melting point of the individual components (e.g. BPA in the present case). This approach has the problem that often monomers with low melting points may start to degrade at high temperatures, especially thermally sensitive monomers like IS. Therefore, a non-reactive monomer mixture should be prepared at the lowest possible temperature. The present illustration shows how to prepare such mixtures where the non-reactive monomer mixture comprises a monomer compound with a melting point below that of the selected diaryl carbonate. The Table below shows the compositions prepared in the present illustration. Monomer component labeled IS (High Na) contained approximately 12-15 ppm sodium. All other monomer components (IS (Low Na), BPA, and C36-diol) contained less than 600 ppm alkali metals. The alkali metal concentration of the monomers was measured using Inductively Coupled Plasma (ICP) Atomic Emission Spectroscopy (AES).

Compositions and Lowest Stable Temperature (LST)

| Test | Monomer 1 | Tm (° C.) | Monomer 2 | Tm (° C.) | LST (° C.) |
|---|---|---|---|---|---|
| WE 1 | 100% IS (high Na) | 60-70 | — | — | 95 |
| WE 2 | 100% IS (low Na) | 60-70 | — | — | 105 |
| WE 3 | C36-diol | LRT | — | — | 110 |
| WE 4 | 50% BPA | 158-159 | 50% IS (low Na) | 60-70 | 105 |
| WE 5 | 100% IS (low Na) | 60-70 | — | — | 115 |
| WE 6 | 100% IS (low Na) | 60-70 | — | — | 105 |
| WE 7 | 50% BPA | 158-159 | 50% IS (low Na) | 60-70 | 115 |

MpBMSC about 109° C.
WE = Working Example
LRT = Liquid at Room Temperature

Working Example 1

IS (High Na)

Figure 4:
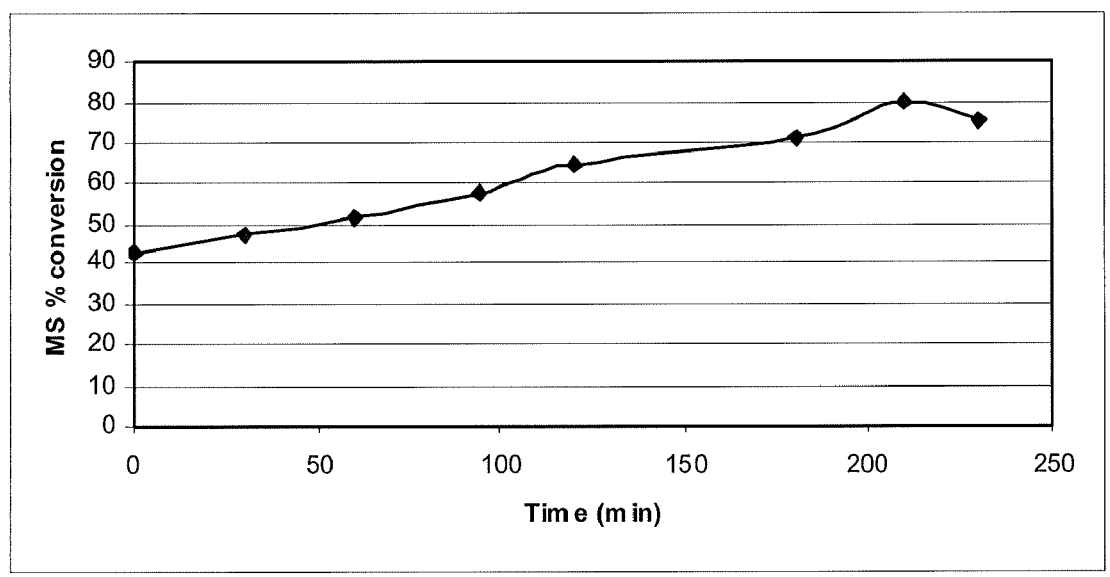

12.0010 g of BMSC and 5.2031 g of IS were loaded into a glass three-neck round bottom flask. The powders were flushed with nitrogen and heated to 120° C., under vigorous stirring and a slight over pressure of nitrogen. 20 minutes after the temperature reached 120° C. the powders were completely dissolved and a clear transparent mixture was observed. As a next step the temperature was lowered to determine Lowest Stable Temperature (LST) (e.g. the minimum temperature that was needed to maintain a clear and transparent mixture that was not too viscous to mix or started to crystallize). For this experiment the Lowest Stable Temperature (LST) was 95° C. The mixture was kept at this temperature for 4 hours during which the conversion was determined by analyzing the sample on MS concentration by high performance liquid chromatography (HPLC). This sample had 80% conversion (see FIG. 4).

Figure 5:
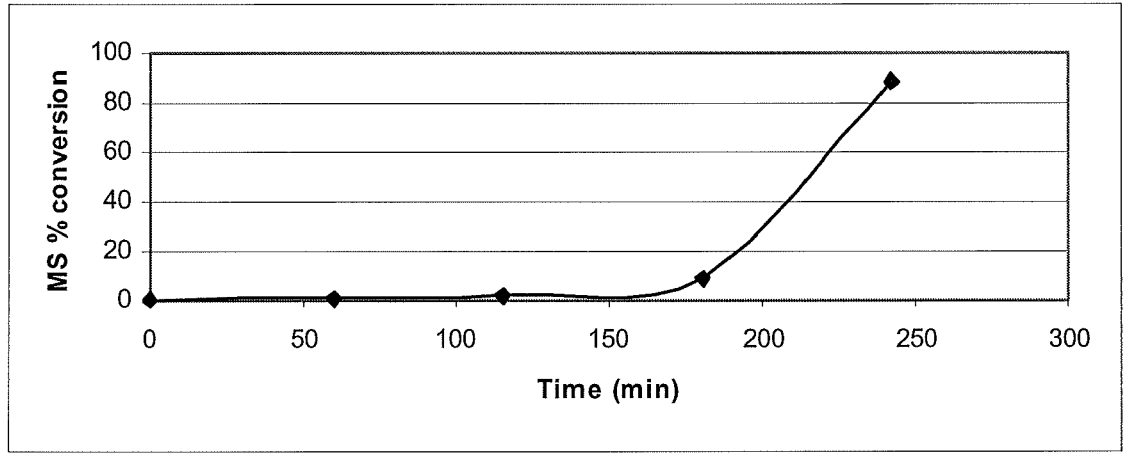

In order to prevent this high conversion from occurring, 200 ppm of phosphoric acid was added giving a delay in the reactivity as shown in FIG. 5.

Working Example 2

IS (Low Na)

Figure 6:
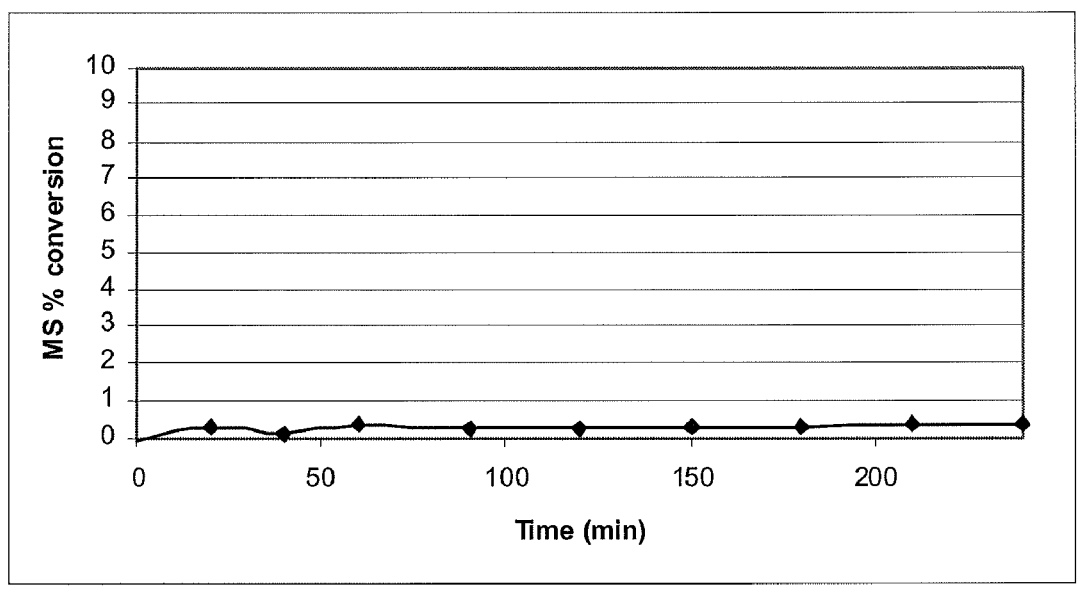

12.0001 g of BMSC and 5.2021 g of IS were loaded into a glass three-neck round bottom flask. The powders were flushed with nitrogen and heated to 120° C., under vigorous stirring and a slight over pressure of nitrogen. When the temperature reached 120° C. the powders were completely dissolved and a clear transparent mixture was obtained. As a next step the temperature was lowered to determine the LST. For this experiment the LST was 105° C. The mixture was kept at this temperature for 4 hours after which the conversion was determined by analyzing the sample on MS concentration by HPLC. This sample had 4-6% conversion (see FIG. 6).

Working Example 3

Figure 7:
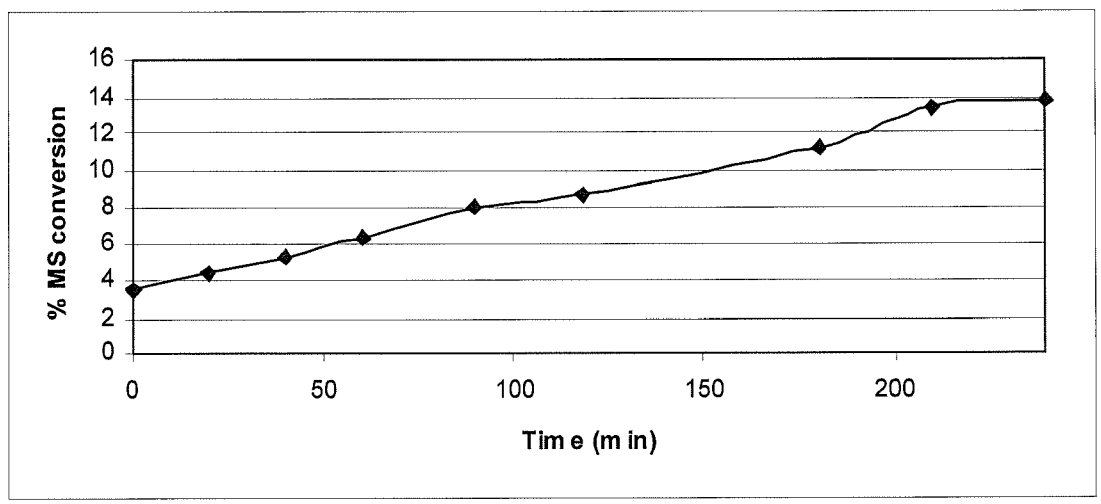

$C_{36}$-diol 6.4998 g of BMSC and 10.9366 g of $C_{36}$-diol were loaded into a glass three-neck round bottom flask. The powders were flushed with nitrogen and heated to 120° C., under vigorous stirring and a slight over pressure of nitrogen. When the temperature reached 120° C. the powders were completely dissolved and a clear transparent mixture was obtained. As a next step the temperature was lowered to the LST of the mixture. For this experiment the LST was 110° C. The mixture was kept at this temperature for 4 hours after which the conversion was determined by analyzing the sample on MS concentration by HPLC. This sample had 14% conversion (see FIG. 7).

Figure 8:
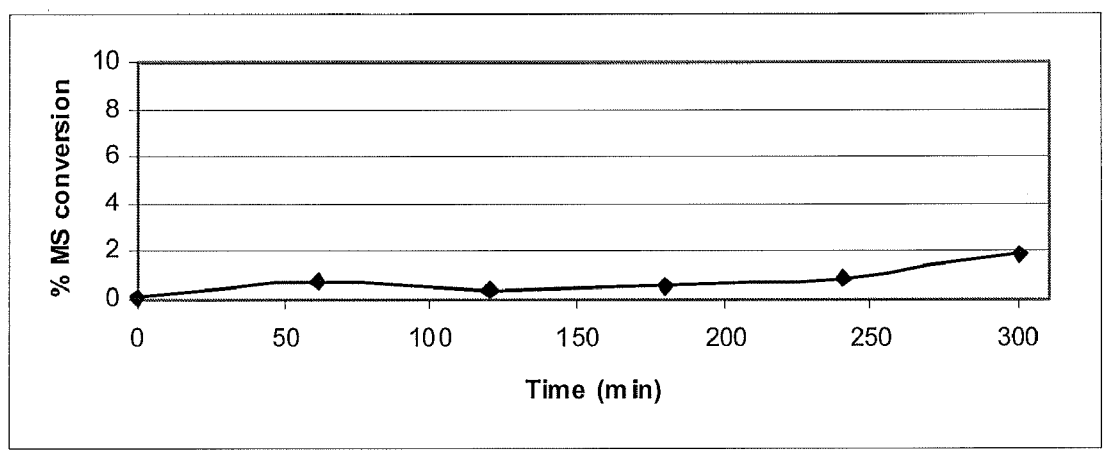

In order to prevent this high conversion from occurring 200 ppm of phosphoric acid was added giving a delay in the reactivity as shown in FIG. 8.

Working Example 4

BPA/IS (Low Na) (50/50)

Figure 9:
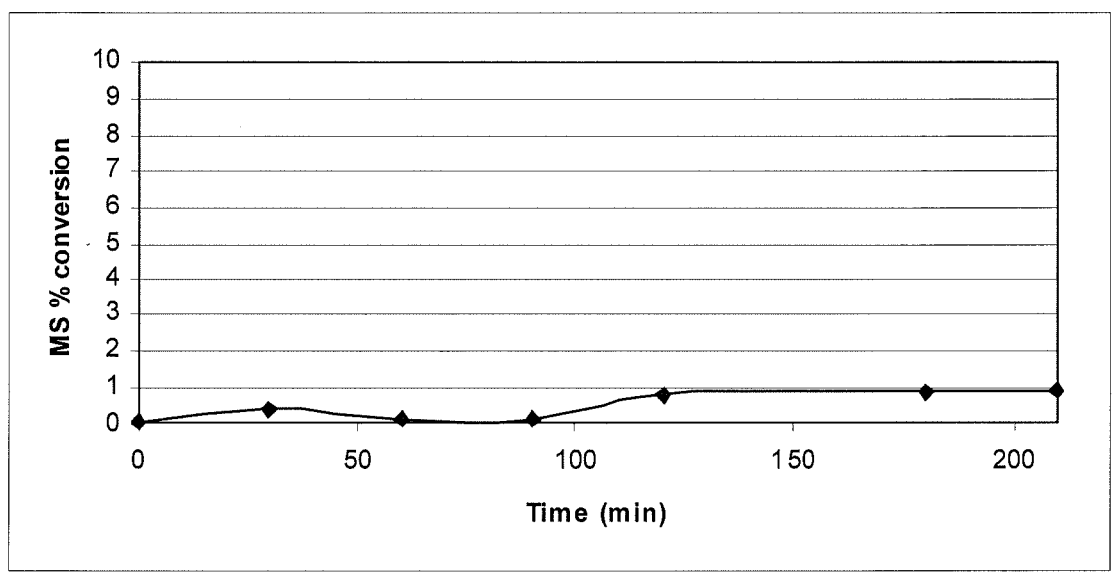

11.0011 g of BMSC is loaded into a glass three-neck round bottom flask. The powder was flushed with nitrogen and heated to 120° C., under vigorous stirring and a slight over pressure of nitrogen. When the temperature reached 120° C. the powder was completely dissolved and a clear transparent mixture was obtained. As a next step the temperature was lowered to 115° C. and subsequently the BPA/IS mixture, 3.7267 g BPA and 2.3861 g IS, was added. When the mix was a homogeneous melt the temperature was further decreased to the LST, which was 105° C. The mixture was kept at this temperature for 4 hours after which the conversion was determined by analyzing the sample on MS concentration by HPLC. This sample had less than 1.5% conversion (see FIG. 9).

Working Example 5

IS (Low Na) (100)

IS to Molten BMSC 12.0010 g of BMSC was loaded into a glass three-neck round bottom flask. The powder was flushed with nitrogen and heated at 120° C. until it was molten. As a second step the temperature was lowered to 115° C. Subsequently a total of about 25 g of IS was added to the molten BMSC in small portions and the mixture was mixed for about 10 minutes after which it was completely molten.

Working Example 6

IS (Low Na) (100)

BMSC to Molten IS 5.0014 g of IS was loaded into a glass three neck round bottom flask. The powder was flushed with nitrogen and heated at 120° C. until it was molten. As a second step the temperature was lowered to 115° C. Subsequently about 25 g of BMSC was added to the molten IS in small portions and the mixture was mixed for 10 minutes after which it was completely molten.

Working Example 7

BPA/IS (Low Na) (50/50)

BPA to Molten BMSC/IS Mix 11.0011 g of BMSC and 2.3861 g of IS were loaded into a glass three-neck round bottom flask. The powder was flushed with nitrogen and heated at 120° C. until it was molten. As a second step the temperature was lowered to 115° C. Subsequently 3.7267 g of BPA was added to the molten BMSC/IS and the mixture was mixed for 20 minutes after which it was completely molten.

Discussion:

A new method is described herein for keeping/maintaining monomer mixtures in melt at a temperature well below the melting point of the component with the highest melting point. From WE 1 to WE 4 one can clearly see the benefit of this method. In the table below a comparison is made between the melting points of each component, and the LST for the compositions tested.

Figure 2:
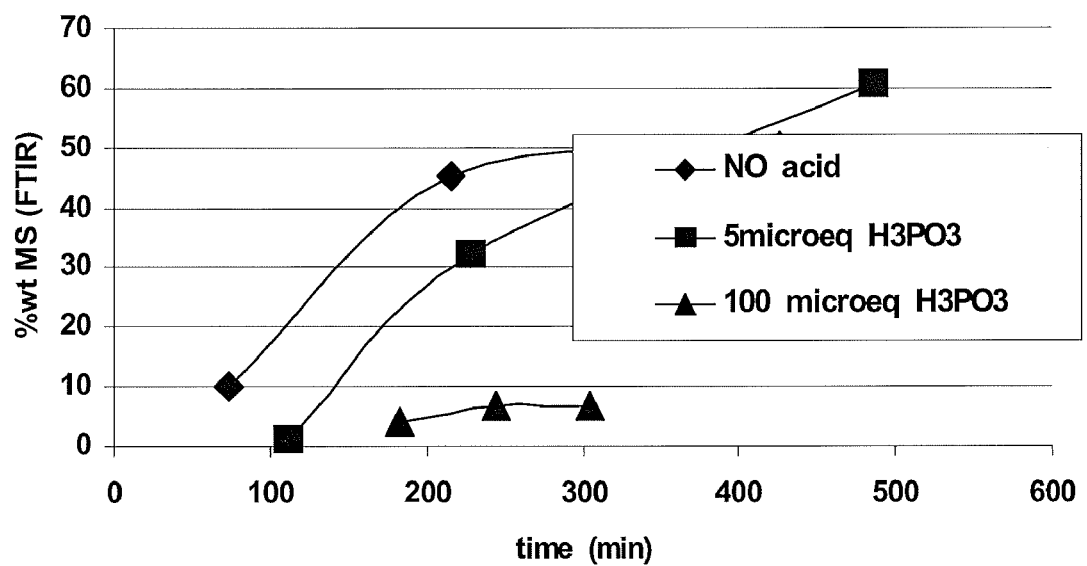
FIGS. 2-15 are graphical representations of results obtained in the example section.
Figure 3:
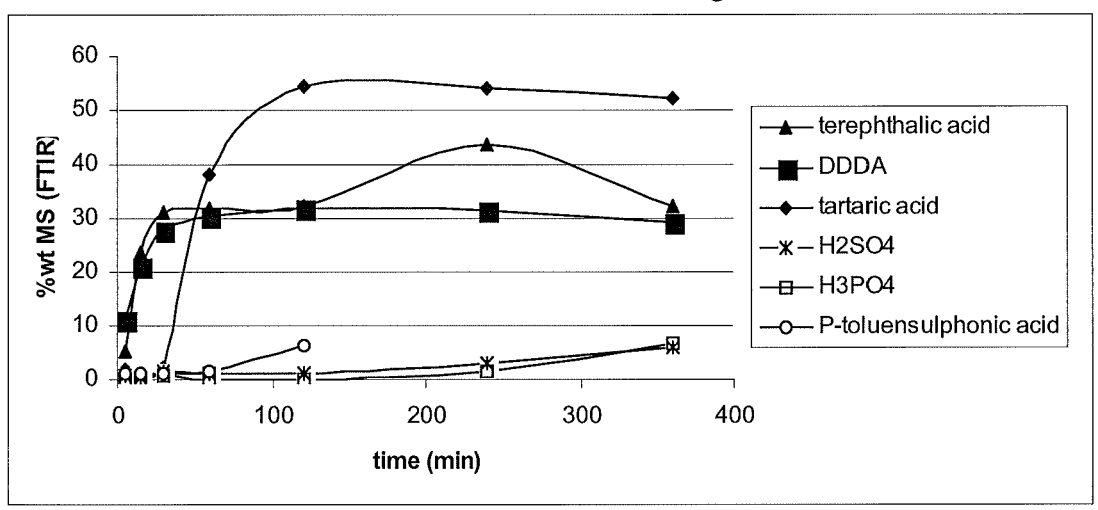

This table shows that the LST of the compositions is lower compared to the component with the highest melting point. This means it is not needed to go up to the highest melting point in order to get a homogeneous reaction mixture. In other words the monomers with the higher melting points are dispersed in the monomer with the lower melting point. Because WE1 and WE3 showed to have significant reactivity these tests were repeated but now in the presence of phosphoric acid. This delayed the reactivity and therefore delayed the formation of potential byproducts. Other acids may be added and FIGS. 2 and 3 demonstrate the effectiveness of the control on reaction of other monomer solutions containing different acids. Phosphoric acid is preferred.

It is also shown in WE 5-7 that the order in which the reactor is loaded or the order in which the monomers are individually molten does not interfere much with the final LST. This shows that the invention is not limited to just one way of loading the reactor.

Example 2

Polymerization of a Non-Reactive Monomer Mixture in a Reactor System Comprising a Batch Reactor and a CSTR in Combination with a Reactive extruder

Working Example 8

Polymerization of Terpolymer Non-Reactive Monomer Mixture not Containing Catalyst at 115° C.

Figure 10:
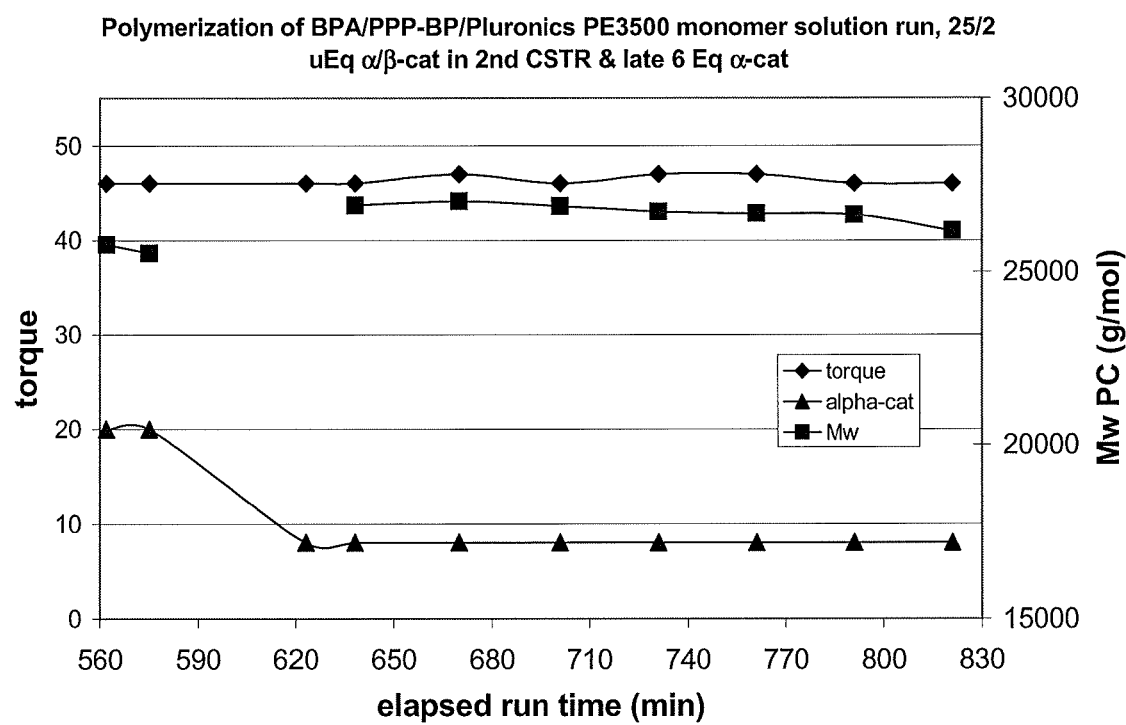

A composition of BPA/PPP-BP 65/35 and 15% w/w polypropylene glycol block copolymer (e.g. PLURONIC® PE 3500) was dissolved in BMSC in a first stirred tank at a temperature of 175° C. and a pressure of 800 mbar. No catalyst solution was initially added to the formulation, and the formulated BMSC/diol mol ratio was 1.023. After a homogenous solution was obtained, temperature of the batch reactor was reduced to 115° C. A catalyst solution of 25 eq of TMAH and 2 eq NaOH (relative to total diol) was also fed with the non-reactive monomer mixture to a CSTR. After 2.5 hours of equilibration time, the non-reactive monomer mixture feed to the CSTR was restarted and the oligomer in the CSTR was continuously fed together with an alpha catalyst solution to a ZSK-25 reactive extruder at a rate of 11.5 kg./hr. This alpha catalyst solution was sufficiently concentrated to give an additional alpha catalyst loading of 1 to 6 eq of Na catalyst (depending on addition rate) relative to the total diol content of the formulation. The ZSK-25 reactive extruder is a 25 mm diameter, twin screw, co-rotating, intermeshing extruder having a length to diameter ratio (LOD) of about 59. Extrusion at standard conditions obtained a polymer with an average PC Mw 26,500 g/mol. No operational issues were observed during the run. A graphical representation of the data obtained over the time of continuous operation is given in FIG. 10.

Polymer Mw stability and byproduct formation were improved versus a batch run with the same composition. The following table shows a comparison of polymer data for a batch oligomerization versus a continuous polymerization of a non-reactive monomer mixture containing BPA/PPP-BP/PLURONIC® PE 3500.

mine the concentration of phenolic byproduct formed (e.g. MS when bismethylsalicylcarbonate (BMSC) is used). Based on the concentration of the formed phenolic byproduct, the % conversion of the diaryl carbonate during storage of the monomer mixture could be determined.

In some examples, oligomers or polymers were prepared from monomer solutions after storage, and the properties of these oligomers were compared with an oligomer or polymers that had been stored for the same amount of time.

The color properties of the example oligomers and polymers were measured by carrying out an UV/Vis measurement on a 5 wt % solution of the sample in chloroform. The byproduct content of the oligomers and polymers was characterized by means of $^1$H NMR carried out on a Bruker Advance ULTRASHIELD® 400 MHz (1H Frequency) system equipped with a 5 mm QNP Probehead. The following settings were used:

Acquisition time: 2.56 secs

Number of scans: 256

Recycle delay: 10 secs

| Polymerization Method | Average Polymer Analytical Data | | | | | |
| --- | --- | --- | --- | --- | --- | --- |
| | Mw PC (g/mol) | delta Mw PC/h | MS (ppm) | I-SC (mole %) | Methyl Carbonate (mole %) | Sal-OH (ppm) |
| Batch Oligomerization | 26,000 | −330 | 161 | 1.13 | 0.56 | 161 |
| Continuous Polymerization of Monomer Solution | 26,500 | 90 | 135 | 0.47 | 0.42 | 135 |

Example 3

Preparation of Non-Reactive Monomer Mixtures Containing Diaryl Carbonate

Working Examples 9-18

Different compositions were used in order to demonstrate non-reactive monomer mixtures made from low melting point monomers using the methods of the present invention.

In these Examples, the low melting point monomer (monomer component 1) was melted at its melting point and the other monomer components and/or diaryl carbonate were dispersed in the first monomer to form the non-reactive monomer mixture. If the monomers did not directly disperse in the molten first monomer, the temperature was increased stepwise until the LDT was reached. After the LDT was reached, the temperature of the monomer mixture was decreased stepwise until the LST was reached. In some cases, the molten mixture exhibited phase separation. If phase separation was observed, the temperature of the molten mixture was increased further, and the temperature at which the molten mixture was only one single phase was noted. In some examples, the additional monomers were added stepwise in portions or each monomer was added sequentially. These minor variations in the preparation of the non-reactive monomer mixture process of addition did not apparently affect the LDT or LST. All of the amounts of monomers in the formulations are given as relative mole %.

In some examples, the % conversion of the monomer mixtures after four hours storage at the LST was measured by carrying out an HPLC analysis of the stored mixture to deter- Experiment: 30 degr.1H-pulswidth Temperature: 44° C.

Samples were analyzed in deuterated chloroform (50 to 70 mg polymer in 1.0 ml CDCl$_3$) containing 0.1 wt. % tetramethylsilane (TMS) as reference. The spectra were obtained by Fourier transformation of the FID after application of 0.3 Hz apodization and phase correction. The chemical shift of the TMS protons is set at 0.0 ppm. A spectrum of the $^1$H NMR solvent was recorded to determine the ratio of undeuterated chloroform (d=7.25 ppm) to TMS.

Gel permeation chromatography (GPC) was used to determine the $M_w$, $M_n$, and polydispersity of the polycarbonates, using a crosslinked styrenedivinylbenzene mixed-bed column. The column temperature was maintained at 25° C. The column was eluted with chloroform as eluent, at a flow rate of 1.00 ml/minute. A refractive index detector was used. The sample solution was prepared by dissolving the 20 milligrams (mg) of the isosorbide polycarbonate in 10 ml of dichloromethane. 10 microliters (μl) of the sample solution was injected in the column and the sample was eluted over a total run time of less than 2 hours. A calibration curve (i.e., a universal calibration curve) was constructed using polystyrene or polycarbonate standards with narrow polydispersity. Molecular weights are expressed as molecular weights against polycarbonate standards. Analysis of a standard against both polystyrene and polycarbonate provided an approximate relationship between molecular weights determined using polystyrene and polycarbonate standards. Thus molecular weights based on polycarbonate standards can be estimated using data based on polystyrene standards (and polystyrene molecular weights based on data using polycarbonate data) using the following formula: Mw(PC)=(0.427×Mw(PS))+4263.

Monomer solutions containing diaryl carbonate were prepared based on using a constant mass of 10 g of the diaryl carbonate. The monomer mixture example compositions and their properties are depicted in the following table. The term "LART" means liquid at room temperature. The term "NA" means not analyzed.

| Example | Carbonate | Monomer 1 | Monomer 2 | LDT [°° C.] | LST [°° C.] | Conv [%] |
|---------|-----------|-----------|-----------|-------------|-------------|----------|
| 9  | BMSC (100)        | 1,4-butanediol (100) | —       | 112       | 112       | 0.17 |
| 10 | BMSC (100)        | Isosorbide (100)     | —       | 100       | 100       | 0.02 |
| 11 | BMSC (100)        | Isosorbide (75)      | BPA (25)| 112       | 112       | 0.27 |
| 12 | BMSC (100)        | C36 diacid (20)      | —       | 112 (152) | 112 (152) | NA   |
| 13 | BMSC (100)        | C36 diacid (20)      | IS (80) | 112       | 112       | 0.67 |
| 14 | DPC (100)         | Isosorbide (100)     | —       | 112 (132) | 112 (132) | NA   |
| 15 | DPC (100)         | Isosorbide (75)      | BPA (25)| 85 (118)  | 85 (118)  | NA   |
| 16 | DPC (75)/BMSC (25)| Isosorbide (100)     | —       | 112       | 112       | NA   |
| 17 | DPC (100)         | 1,4-butanediol (100) | —       | 90 (122)  | 90 (122)  | NA   |
| 18 | BNPC (100)        | Isosorbide (100)     | —       | >138      | >138      | NA   |

Discussion and Conclusions:

Working Examples 12, 14, 16, and 17 were visibly phase separated at the given LDT/LST. However increasing the temperature to the temperature given in parentheses in the table converted them into single-phase mixtures. In example 18, only a dark brown non-clear solution was obtained. The inventors hypothesize that this might indicates that the monomer mixture was reacting/degrading.

When BMSC was used as the diaryl carbonate, the monomer mixture including only $C_{36}$ diacid had 2-phases (Working Example 12). Miscibility was improved and only one phase was observed when IS was also present in the mixture (Working Example 13). When DPC was used as the diaryl carbonate, 2-phases were observed in the mixture with IS (Working Example 14). Miscibility was improved and only one phase was observed when BPA was also present in the mixture (Working Example 15).

Example 4

Preparation of Non-Reactive Monomer Mixtures Containing No Diaryl Carbonate

Working Examples 19-21

Non-reactive monomer mixtures containing no diaryl carbonate were prepared based on using a constant mass of 10 g of the diol monomers. The non-reactive monomer mixture example compositions and their properties are depicted in the following table.

Non-Reactive Monomer Mixtures Containing No Diaryl Carbonate

| Work. Ex. | Monomer 1 | Monomer 2 | LDT [° C.] | LST [° C.] |
|-----------|-----------|-----------|------------|------------|
| 19 | Isosorbide (34) | BPA (66) | 142 | 137 |
| 20 | Isosorbide (61) | BPA (39) | 100 | <65 |
| 21 | Isosorbide (82) | BPA (18) | 100 | <65 |

Discussion and Conclusions:

The LST's of these non-reactive monomer mixtures were below the melting point of the second monomer having the higher melting point (BPA mp=158° C.). When IS was the most abundant compound in the mixture, the melt behavior of the mixture is comparable to IS only, and it remains a liquid for long periods of time below the melting point of IS.

Example 5

Oligomerization of Non-Reactive Monomer Mixtures

Working Examples 22-24

Oligomerization of monomers and of non-reactive monomer mixtures were carried out and are compared with each other. The formulation was BMSC (102)/IS (80)/BPA (20) based on a constant mass of 10 g of BMSC, the catalyst was 5 µeq of NaOH relative to the diaryl carbonate concentration, and the oligomerization was carried out for 45 min at 170° C.

Working Example 22

The oligomer was prepared, sampled, and then stored for two hours in the molten phase at 170° C.

Working Example 23

A non-reactive monomer mixture containing BMSC was prepared as described earlier and stored for two hours at the LST prior to catalyst addition and oligomerization at 170° C., as described above.

Working Example 24

A non-reactive monomer mixture contained only the diols IS and BPA was prepared as described earlier and stored for two hours at the LST prior to addition of BMSC and catalyst and subsequent oligomerization at 170° C., as described above.

Figure 11:
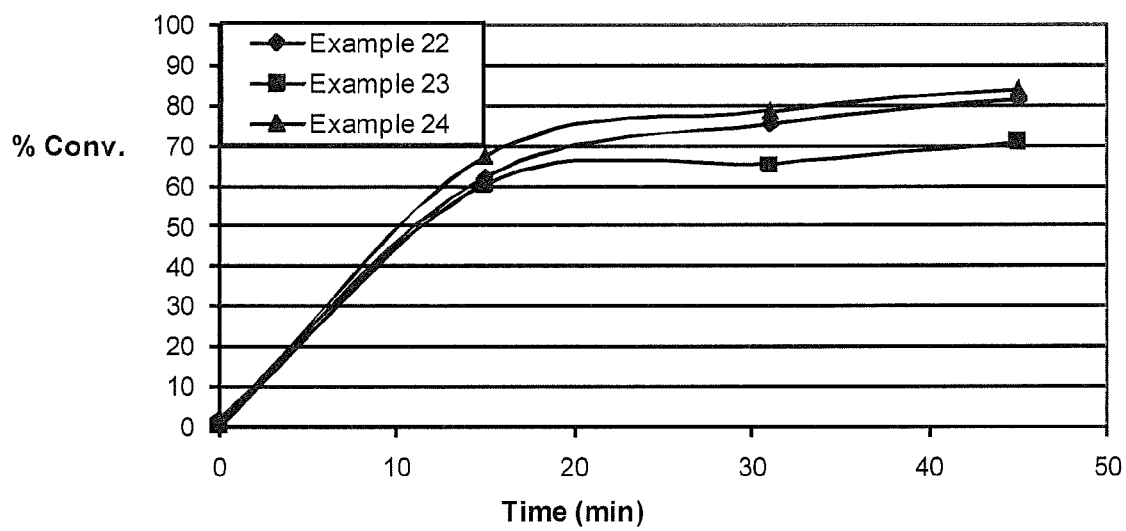
Figure 12:
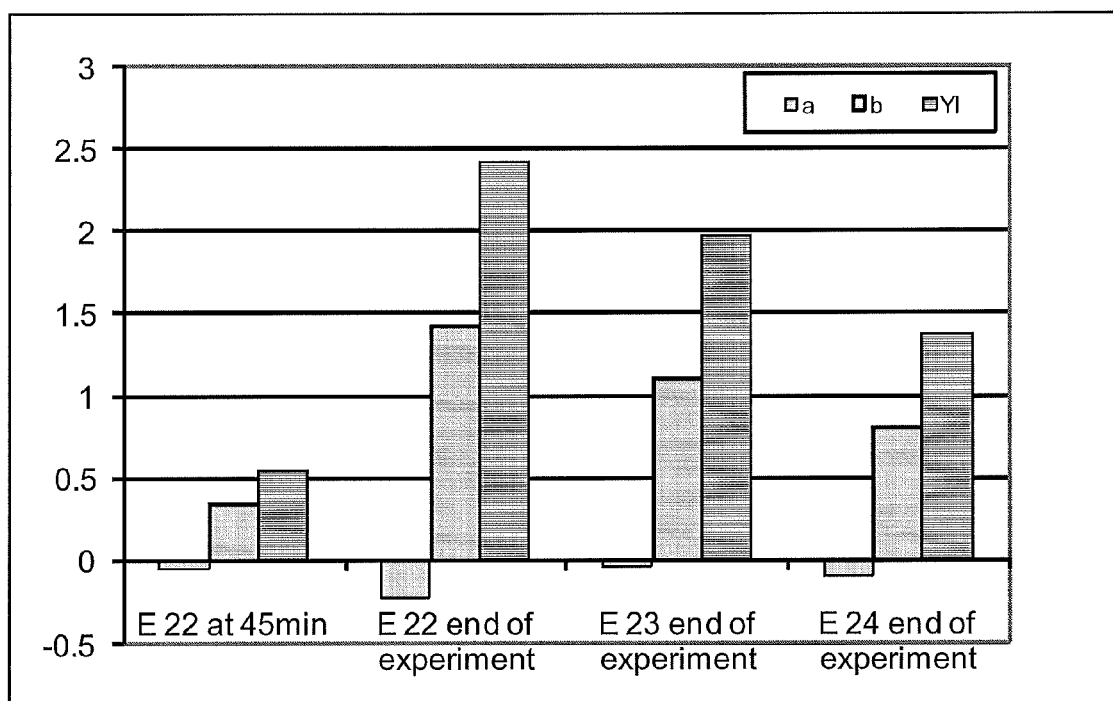

Oligomers were characterized by taking and analyzing samples from the time of the catalyst addition (t=0) to the end of the reaction. The evolution of the oligomerization reaction, expressed as conversion vs. time is plotted in FIG. 11 and the color and byproduct levels of the examples are given in the following tables and in FIG. 12.

L*, a*, b* and YI Values (for 10% n/v solutions) of the Oligomer Samples

| Sample | Sample Time | L* | a* | b* | YI |
|---|---|---|---|---|---|
| WE 22 | 45 min | 99.6 | 0.0 | 0.3 | 0.6 |
| | End of experiment | 99.6 | −0.2 | 1.4 | 2.4 |
| WE 23 | End of experiment | 99.4 | 0.0 | 1.1 | 2.0 |
| WE 24 | End of experiment | 99.7 | −0.1 | 0.8 | 1.4 |

Mol % of end groups determined by $^1$H NMR analysis of the samples in Examples 22-24.

| Sample | Sample Time | BPA-OH [mol%] | Sal-OH [mol%] | TMSC [mol%] |
|---|---|---|---|---|
| WE 22 | 45 min | 0.54 | 0.09 | 35.6 |
| | End of experiment | 0.73 | 0.11 | 25.8 |
| WE 23 | End of experiment | 0.48 | 0.05 | 41.3 |
| WE 24 | End of experiment | 0.61 | 0.07 | 34.6 |

Discussion and Conclusions

The advantage of storing non-reactive monomer mixtures rather than molten oligomers can be seen by comparing Working Examples 22 to 24. The oligomerizations had similar reactivity, but the final oligomer has more color in the case of the stored molten oligomer (Working Example 22), and the non-reactive monomer mixtures (Working Examples 23 and 24) had no significant conversion or reaction until catalyst was added. For this reason, the oligomers prepared from the non-reactive monomer mixtures have less color and a lower content of free OH-containing byproducts than does the stored molten oligomer. The oligomer prepared from the stored non-reactive monomer mixture not containing diaryl carbonate (Working Example 24) has somewhat less color than the oligomer prepared from the stored non-reactive monomer mixture containing diaryl carbonate (Working Example 23).

Example 6

Polymerization of Non-Reactive Monomer Mixtures

Working Examples 25-28

Polymerization reactions were performed on some of the non-reactive monomer mixtures. The reactions were carried out in glass tube reactors. Before charging the monomers the glass reactor tubes where soaked in 1M HCl for 24 hours to remove any sodium present at the surface of the glass. After this acid bath the glass tubes were rinsed using 18.2 MW (Milli-Q quality) water for at least 5 times. The batch reactor tubes were charged at ambient temperature and pressure with 25.00 grams of solid BMSC and the required number of grams of solid IS and BPA to obtain a relative stoichiometry BMSC/IS/BPA of 101/80/20 for each example. After this the reactor system was sealed shut, the system was deoxygenated by briefly evacuating the reactors and then introducing nitrogen. This process was repeated three times. 100 μl of the catalyst solution (prepared from 0.5 M aqueous sodium hydroxide and diluted to the required concentration) was added to each reactor as an aqueous solution in the following examples to give a catalyst concentration of 40 μeq of NaOH relative to BMSC.

The temperature of the reactor was maintained using a heating mantle with a PID controller. The pressure over the reactor was controlled by a nitrogen bleed into the vacuum pump downstream of the distillate collection flasks and measured with a pressure gauge. The reactor was brought to near atmospheric pressure and the reaction time is started at the same moment as the heaters were turned on. The reactions were carried out according to the conditions specified in each Example. In the following tables, "Tr" is the set point temperature of the reactor; and "To" is the set point temperature of the overhead vacuum system. The vacuum system removed the methyl salicylate byproduct, which was condensed in condensers. The product was recovered by removing a drain nut at the bottom of each reactor.

The final properties of the polymer (e.g. color, molecular weight, and end groups) were measured and compared. See table below. For these experiments the polymerization was carried out with a BMSC (102)/IS (80)/BPA (20) formulation using 40 μeq of NaOH as a catalyst. In Example 26 the oligomer was prepared and stored at 170° C. for two hours. After this time the polymerization was performed. In Example 25, a diol non-reactive monomer mixture (IS (80)/BPA (20)) was stored just above the LST for two hours. After this time, the carbonate and the catalyst were added and the polymerization was performed.

After the reactions, the obtained polymers were analyzed by: SEC to measure the molecular weight (Mw, Mn and PD); UV/Visible spectroscopy to measure the color (L*, a*, b* and YI); and $^1$H NMR to determine the molar composition including byproducts.

The experimental procedure followed to perform these examples is detailed below.

Working Example 25

Polymerization with No Storage of Oligomer or Monomer Mixture

The monomers BMSC, BPA, and IS were loaded in the glass reactor of the small-scale melt-polymerization system and connected to the overhead vacuum system. After a deoxygenation step, catalyst was added to the reaction mixture, and the reaction was carried out following the profile indicated in the table below in which the oligomerization and polymerization are carried out directly with no intermediate storage.

Reaction Profile for the Polymerization of BMSC (101)/BPA (20)/IS (80)

| Time | Remarks |
|---|---|
| 0:00:00 | T$_r$ reached 170 ° C.; T$_o$ reached 100° C., pressure reached 100 kPa |
| 0:06:00 | Set stirrer to approximately 40 rpm |
| 0:15:00 | Set Tr to 230° C. |
| 0:30:00 | Set P at 50 kPa |
| 0:50:00 | Set Tr at 270° C. and P at <0.2 kPa |
| 1:04:00 | Open reactor under nitrogen flow and stop reaction. Drain polymer from reactor. |

Example 26

Polymerization with Oligomer Stored for 2 Hours at 170° C.

Example 25 was repeated, except the oligomer was stored after preparation for 2 hours at 170° C. under a 100 kPa nitrogen atmosphere (e.g. the Tr was set to 230° C. after 2:15:00 instead of 0:15:00).

Example 27

Polymerization of a Stored Non-Reactive Monomer Mixture Containing No Diaryl Carbonate

The monomers BPA and IS were loaded into the glass reactor of the small-scale melt-polymerization system and connected to the overhead vacuum system. After a deoxygenation step, the sample was heated to 100° C. to disperse the monomers and to prepare the non-reactive monomer mixture and then the temperature was immediately reduced to 85° C. The non-reactive monomer mixture was kept at 85° C. for 2 hours with stirring. After this time, the glass reactor was detached from the vacuum system and BMSC was added to the reaction. After, the glass reactor was attached to the vacuum system and a second deoxygenation step was performed. Catalyst was then added and the oligomerization and polymerization was carried out following the profile indicated in the table above.

Example 28

Polymerization of a Stored Non-Reactive Monomer Mixture not Containing a Diaryl Carbonate

Example 27 was repeated, but BMSC was added to the non-reactive monomer mixture after storage through an opening in the top of the warm reactor using 5 ml of MS to flush down the BMSC into the reaction mixture. Subsequently, catalyst was added, and the oligomerization and polymerization was carried out following the profile indicated in the table above.

Molecular Weight, Color and Molar Composition of the Polymers.

Figure 13:
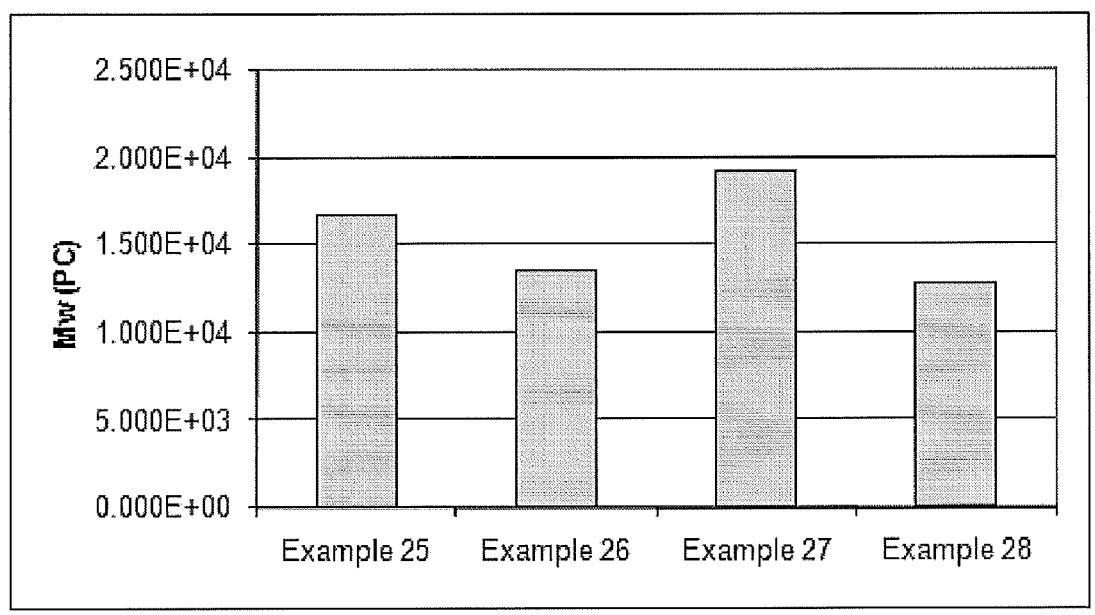
Figure 14:
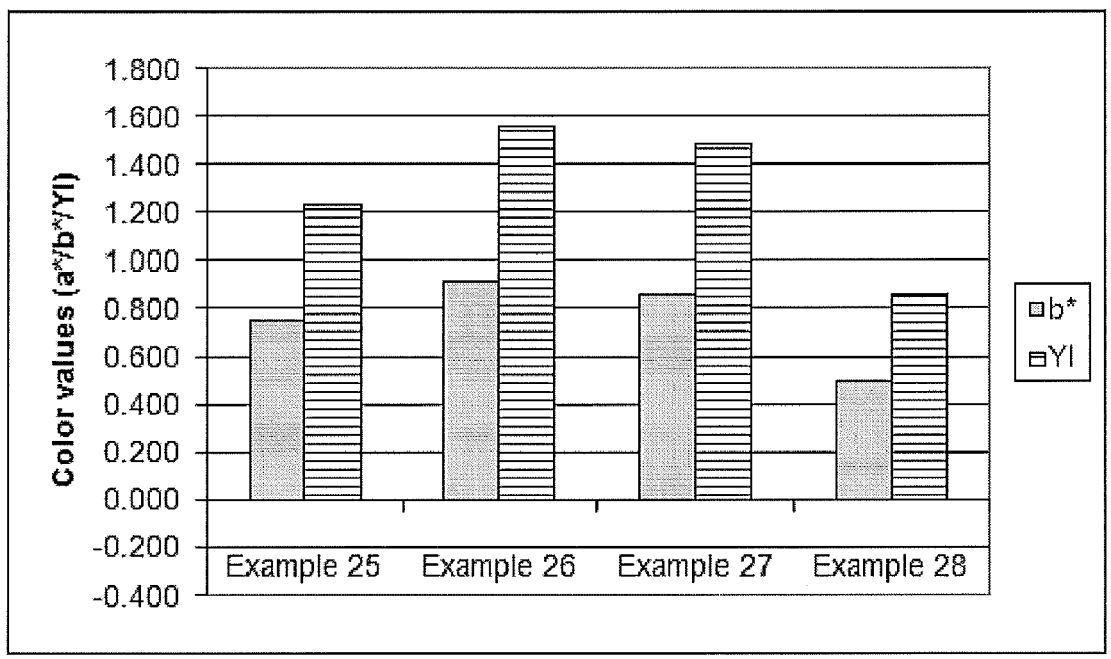
Figure 15:
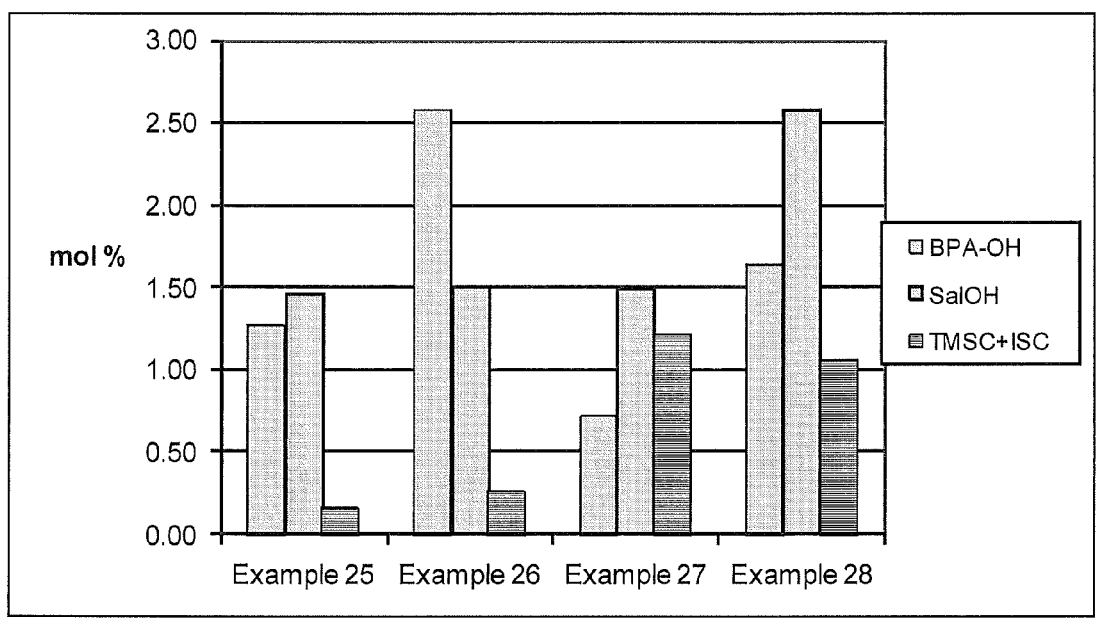

For a further comparison, the molecular weight, color and end groups of the examples are plotted in FIG. 13, FIG. 14, and FIG. 15.

Discussion and Conclusion

The direct polymerization without storage of oligomer or non-reactive monomer mixture (Working Example 25) and the polymerization of the stored non-reactive monomer mixture (Working Example 27) gave similar results regarding molecular weight and color. In addition, the content of the chainstopping byproduct Sal-OH ending groups is approximately the same for both polymers, indicating that the storage of the non-reactive monomer mixture had no negative influence regarding this chainstopping byproduct. Interesting to note is that the BPA-OH content is lower and the TMSC content is higher in the stored non-reactive monomer mixture (Working Example 27). Therefore it can be concluded that the storage of non-reactive monomer mixture has no negative effect on the subsequent conversion of the monomer in the polymer, and, in fact, it appears it even may have a beneficial effect (both polymers are prepared with excess BMSC, and therefore TMSC would be expected to be the dominant end group at full conversion).

When an oligomer previously stored for two hours at 170° C. is used in the polymerization (Working Example 26), the molecular weight is lower and the BPA-OH is significantly higher indicating a problem with obtaining full conversion of the monomers. It is also noteworthy that the color of the lower molecular weight polymer, Working Example 26, is worse than that of the higher molecular weight polymer, Working Example 25. For the same composition and polymerization profile, color is actually expected to decrease as molecular weight of the polymer decreases due to the lower shear in the polymerization stage. Therefore significant discoloration was caused by the storage of the molten oligomer.

A comparison of the two examples having similar molecular weights, Working Examples 26 (stored oligomer) and 28 (stored non-reactive monomer mixture), further illustrates the color benefit of storing a non-reactive monomer mixture compared to storing a molten oligomer prior to polymerization. For approximately the same molecular weight, less color and BPA-OH end groups are obtained when the non-reactive monomer mixture is used. The higher level of TMSC/ISC obtained with in Working Example 28 may be due to the

|  | Sample | UOM | Example 25 | Example 26 | Example 27 | Example 28 |
|---|---|---|---|---|---|---|
| MW | Mw(PC) | g/mol | 1.666E+04 | 1.354E+04 | 1.918E+04 | 1.276E+04 |
|  | Mn(PC) | g/mol | 6.942E+03 | 6.217E+03 | 8.274E+03 | 5.623E+03 |
|  | PD | — | 2.40 | 2.18 | 2.32 | 2.27 |
| COLOR | L | — | 99.883 | 99.787 | 99.790 | 99.751 |
|  | a* | — | −0.143 | −0.116 | −0.065 | 0.000 |
|  | b* | — | 0.751 | 0.917 | 0.857 | 0.492 |
|  | YI | — | 1.237 | 1.563 | 1.491 | 0.867 |
| COMPONENTS | BPA | mol % | 18.9 | 18.3 | 19.2 | 18.6 |
|  | IS | mol % | 76.9 | 74.9 | 76.7 | 74.5 |
|  | BPA-OH | mol % | 2.50 | 5.02 | 1.44 | 3.24 |
|  | SalOH | mol % | 1.44 | 1.47 | 1.48 | 2.54 |
|  | res MS | mol % | 0.11 | BDL | BDL | BDL |
|  | TMSC + ISC | mol % | 0.16 | 0.26 | 1.11 | 1.04 | addition of MS used to flush the BMSC. Therefore it may be preferred to add diaryl carbonates to non-reactive monomer mixtures without using MS as a solvent or flushing agent.

Example 7

Polymerization of Non-Reactive Monomer Mixture on Plug-Flow Reactor/Flash Devolatilization/Reactive Extruder Hybrid System Working Example 29

In this example the non-reactive monomer mixtures described herein can be polymerized using the plug-flow reactor/flash devolatilization/reactive extruder hybrid system shown in FIG. 1. In this system the batch reactor (A) is charged at ambient temperature and pressure with the diol monomers, solid BMSC, and a solid monofunctional phenol capping agent para-cumyl phenol (PCP). The PCP capping agent is added in amounts to yield approximately 40 mole % of PCP end groups at the targeted molecular weight. The standard BMSC/diol monomer molar ratio is 1.02. After this the monomer mix reactor is sealed shut. The system is deoxygenated by briefly evacuating the monomer mix reactor and then introducing nitrogen. This process is repeated three times. Then, in order to melt the diaryl carbonate and prepare the non-reactive monomer mixture, the pressure is set to 800 mbar and the temperature is increased at about 120° C. The liquid mixture is continuously stirred and when a clear solution is obtained the temperature is reduced to 120° C.

Using a piston pump (B), the molten monomer mix is then fed to a preheater (C). This preheater heats up the monomer mix to the desired oligomerization temperature. After the preheater, the catalyst solution (tetramethylammonium hydroxide and/or sodium hydroxide aqueous solution) is added by using pumps (D) and (E). The oligomerization reaction takes place in the plug flow reactor (F). The oligomerization temperatures typically range between 150 and 230° C., the residence time in the plug flow reactor varies between 2-10 minutes. The pressure is typically kept at about 4 bar, in order to ensure that no vapor phase is formed.

The oligomer is then feed to the preheater (G). The temperature in this preheater range between 150 and 240° C. The pressure is kept below 500 mbar in order to start evaporation of methyl salicylate (MS). The concentration of MS remaining in the liquid phase (oligomer) varies between about 10 and 20 wt %. Then, the oligomer mixture is fed through the distributor into the flash vessel (H). In the flash vessel, additional MS is removed and molecular weight is further increased. In the flash vessel the pressure typically varies between 50 and 300 mbar, the temperature is kept between 150 and 240° C.

The MS evaporated leaves the flash vessel and condenses in condensers (K1) and (K2). It is collected as a liquid in storage vessel (L).

The oligomer is pumped out of the flash vessel to the extruder using the gear pump (I). The amount of MS in this oligomer varies between 0.5 and 20 wt %, depending on the temperature and pressure settings of the flash vessel.

The extruder used is a ZSK-25 type extruder as previously described. The oligomer was fed to the extruder at a rate between 5 and 25 kg/h. The screw speed varies between 300 and 500 rpm. The barrels of the extruder are set at 300° C., the die head at 310° C. The ZSK-25 extruder is equipped with a high vacuum system to further remove the methyl salicylate formed as a byproduct in the polycondensation reaction. Polycarbonate is removed from the extruder.

The invention claimed is:

1. A method of forming a non-reactive monomer mixture suitable for use in a melt transesterification reaction to form polycarbonate, the method comprising the steps of:
   (i) selecting a first monomer compound and a second monomer compound, wherein the melting point of the second monomer compound is greater than the melting point of the first monomer compound,
   (ii) adjusting the temperature of the first monomer compound to a first temperature that is:
   equal to or above the melting point of the first monomer compound, and less than the melting point of the second monomer compound;
   (iii) adding the second monomer compound to the first monomer compound,
   wherein the first temperature is selected such that the second monomer compound added to the first monomer compound is dispersed in the first monomer compound to produce a non-reactive monomer mixture, and
   (iv) performing a monomer conditioning step selected from the group consisting of:
      (a) testing the first and second monomer compounds for the presence of alkali metal, and if said alkali metal is present in either or both of the first and second monomer compounds, performing a step selected from the group consisting of:
         (I) treating the monomer compounds which have said alkali metal present to reduce the level of said alkali metal to an amount of less than 600 ppb,
         (II) adding an acid stabilizer to the monomer compounds which have said alkali metal present, and
         (III) a combination of steps (I) and (II), and
      (b) treating the first and the second monomer compounds with a step selected from the group of:
         (I) treating the monomer compounds to reduce the level of said alkali metal to an amount of less than 600 ppb,
         (II) adding an acid stabilizer to the monomer compounds, and
         (III) a combination of steps (I) and (II)
   thereby forming a non-reactive monomer mixture.

2. The method of claim 1, wherein the method is accomplished by performing step (iv) before or after either or both of steps (ii) or (iii).

3. The method of claim 2, wherein the method is accomplished by performing step (ii) either before or after step (iii).

4. The method of claim 1, wherein the acid stabilizer comprises a phosphorus containing acid.

5. The method of claim 1, where the method further comprises the steps of:
   (v) selecting a diaryl carbonate for use in said melt transesterification reaction; wherein the melting point of the first monomer compound is below the melting point of the selected diaryl carbonate,
   (vi) adjusting the temperature of the first monomer compound to a second temperature, wherein the second temperature is equal to or above the melting point of the first monomer compound and less than 40° C. above the melting point of the selected diaryl carbonate, and
   (vii) adding the selected diaryl carbonate to the first monomer compound,
   wherein the first temperature is further selected such that the selected diaryl carbonate added to the first monomer compound is dispersed in the first monomer compound to produce a non-reactive monomer mixture.

6. The method of claim 5, wherein the mole ratio of total moles of the first and second monomer compounds to the moles of the selected diaryl carbonate is equal to or between 0.9 to 1.1.

7. The method of claim 5, wherein the method is accomplished by performing steps (i) to (iv) prior to steps (v) to (vii), wherein the method further comprises the steps performed after steps (i) to (iv) and prior to steps (v) to (vii) of lowering the temperature of the non-reactive monomer mixture, and storing the non-reactive monomer mixture for a period of between 1 and 24 hours.

8. The method of claim 5, wherein the selected diaryl carbonate comprises BMSC and wherein the first monomer compound comprises a compound selected from the group consisting of: isosorbide, ethylene glycol, 1,3-Propanediol, 1,2-Propanediol, 1,4-Butanediol, 1,3-Butanediol, 1,5-Pentanediol, 1,6-Hexanediol, 1,7-Heptanediol, 1,10-Decanediol, 1,2-Cyclohexanediol, trans-1,2-Cyclohexanediol, cis-1,2-Cyclohexanediol, 1,4-Cyclohexanedimethanol, $C_{36}$ branched fatty diol, 1,2,6-Hexanetriol, resorcinol, block copolymers based on ethylene oxide and propylene oxide, and ethoxylate polymers.

9. The method of claim 8, wherein the second monomer compound is selected from the group consisting of BPA, $C_{36}$ diacid, and $C_{36}$ diol.

10. The method of claim 8, wherein the first monomer compound comprises isosorbide and the second monomer compound comprises BPA, wherein the method further comprises the addition of a third monomer compound to the first dihydroxy compound, wherein the third monomer compound is selected from the group consisting of $C_{36}$ diacid, $C_{36}$ diol, dodecanedioic acid, and sebacic acid.

11. The method of claim 8, wherein the selected diaryl carbonate comprises BMSC or DPC, and wherein the method further comprises the step of adding a phenolic compound to the first monomer compound, wherein if the selected diaryl carbonate comprises BMSC the phenolic compound comprises methyl salicylate, and wherein if the diaryl carbonate comprises DPC the phenolic compound comprises phenol.

12. The method of claim 5, wherein the selected diaryl carbonate comprises BMSC.

13. The method of claim 1, further comprising the steps of lowering the temperature of the non-reactive monomer mixture, and storing the non-reactive monomer mixture for a period of between 1 and 24 hours.

14. The method of claim 1, wherein the amount in weight of the first monomer compound is greater than the amount in weight of the second monomer compound in the non-reactive monomer mixture.

15. The method of claim 14, wherein amount in weight of the first monomer compound is at least 50% more than the amount in weight of the second monomer compound in the non-reactive monomer mixture.

16. A method of forming a non-reactive monomer mixture suitable for use in a melt transesterification reaction to form polycarbonate, the method comprising the steps of:
(i) providing a diaryl carbonate;
(ii) selecting a first monomer compound, wherein the melting point of the first monomer compound is below the melting point of the diaryl carbonate,
(iii) performing a monomer conditioning step selected from the group consisting of:
(a) testing the first monomer compound for the presence of alkali metal prior to forming the non-reactive monomer mixture, and if said alkali metal is present, performing a step selected from the group consisting of:
(I) treating the first monomer compound to reduce the level of said alkali metal to an amount of less than 600 ppb,
(II) adding an acid stabilizer to the first monomer compound, and
(III) a combination of steps (I) and (II), and
(b) treating the first monomer compound with a step selected from the group of:
(I) treating the first monomer compound to reduce the level of said alkali metal to an amount of less than 600 ppb,
(III) adding an acid stabilizer to the first monomer compound, and
(III) a combination of steps (I) and (II),
(iv) adjusting the temperature of the first monomer compound, the diaryl carbonate, or both the first monomer compound and the diaryl carbonate to a first temperature that is:
less than 40° C. above the melting point of the diaryl carbonate; and
(v) combining the diaryl carbonate with the first monomer compound,
wherein the first temperature is selected such that the diaryl carbonate and the first monomer compound disperse to form the non-reactive monomer mixture.

17. The method of claim 16, wherein step (iv) is performed by adjusting the temperature of the first monomer compound to a first temperature that is:
less than 40° C. above the melting point of the diaryl carbonate; and
step (v) is performed by adding the diaryl carbonate to the first monomer compound,
wherein the first temperature is selected such that the diaryl carbonate is dispersed in the first monomer compound to produce the non-reactive monomer mixture.

18. The method claim 17, wherein the diaryl carbonate is at a temperature in a range between 10° C. and 40° C. when it is added to the first monomer compound.

19. The method of claim 16, wherein step (iv) is performed by adjusting the temperature of the diaryl carbonate to a first temperature that is:
less than 40° C. above the melting point of the diaryl carbonate; and
step (v) is performed by adding the first monomer compound to the diaryl carbonate,
wherein the first temperature is selected such that the first monomer compound is dispersed in the diaryl carbonate to produce the non-reactive monomer mixture.

20. The method of claim 19, wherein the first monomer compound is at a temperature in a range between 10° C. and 40° C. when it is added to the diaryl carbonate.

21. The method of claim 16, wherein step (v) occurs prior to step (iv) and wherein step (iv) is performed by adjusting the temperature of the first monomer compound and the diaryl carbonate to a first temperature that is less than 40° C. above the melting point of the diaryl carbonate.

22. The method of claim 16, wherein step of (iv) adjusting the temperature of the first monomer compound, the diaryl carbonate, or both the first monomer compound and the diaryl carbonate to a first temperature that is less than 5° C. above the melting point of the diaryl carbonate.

23. The method of claim 16, wherein the diaryl carbonate comprises BMSC or DPC, and wherein the method further comprises the step of combining a phenolic compound with the first monomer compound, the diaryl carbonate, or both the first monomer compound and the diaryl carbonate, wherein if the diaryl carbonate comprises BMSC the phenolic compound comprises methyl salicylate, and wherein if the diaryl carbonate comprises DPC the phenolic compound comprises phenol.

24. The method of claim 16, wherein the selected diaryl carbonate comprises BMSC and wherein the first monomer compound comprises a compound selected from the group consisting of: isosorbide, ethylene glycol, 1,3-Propanediol, 1,2-Propanediol, 1,4-Butanediol, 1,3-Butanediol, 1,5-Pentanediol, 1,6-Hexanediol, 1,7-Heptanediol, 1,10-Decanediol, 1,2-Cyclohexanediol, trans-1,2-Cyclohexanediol, cis-1,2-Cyclohexanediol, 1,4-Cyclohexanedimethanol, $C_{36}$ branched fatty diol, 1,2,6-Hexanetriol, resorcinol, block copolymers based on ethylene oxide and propylene oxide, and ethoxylate polymers.

25. The method of claim 16, further comprising the steps of lowering the temperature of the non-reactive monomer mixture, and storing the non-reactive monomer mixture for a period of between 1 and 24 hours.

26. The method of claim 16, wherein the first monomer compound and the diaryl carbonate are present in a mole ratio of from 0.9 to 1.1.

27. The method of claim 16, wherein the acid stabilizer comprises a phosphorus containing acid.

28. The method of claim 16, wherein the selected diaryl carbonate comprises BMSC.

29. A non-reactive monomer mixture consisting of a diaryl carbonate and a second monomer compound both dispersed in a melted first monomer compound, wherein:
    (I) the diaryl carbonate and the second monomer compound have melting points greater than the melting point of the first monomer compound;
    (II) the non-reactive monomer mixture comprises less than 600 ppb alkali metal, an acid stabilizer, or both less than 600 ppb alkali metal and an acid stabilizer;
    (III) the mole ratio of the first and second monomer compounds to the diaryl carbonate between 0.9 to 1.1 inclusive; and
    (IV) the monomer mixture is at a temperature equal to or above the melting point of the first monomer compound and less than 5° C. above the melting point of the diaryl carbonate.

30. The non-reactive monomer mixture of claim 29, wherein the diaryl carbonate comprises BMSC and wherein the first monomer compound comprises a compound selected from the group consisting of: isosorbide, ethylene glycol, 1,3-Propanediol, 1,2-Propanediol, 1,4-Butanediol, 1,3-Butanediol, 1,5-Pentanediol, 1,6-Hexanediol, 1,7-Heptanediol, 1,10-Decanediol, 1,2-Cyclohexanediol, trans-1,2-Cyclohexanediol, cis-1,2-Cyclohexanediol, 1,4-Cyclohexanedimethanol, $C_{36}$ branched fatty diol, 1,2,6-Hexanetriol, resorcinol, block copolymers based on ethylene oxide and propylene oxide, and ethoxylate polymers.

31. The non-reactive monomer mixture of claim 29, wherein the amount in weight of the first monomer compound is greater than the amount in weight of the second monomer compound in the non-reactive monomer mixture.

32. The non-reactive monomer mixture of claim 29, wherein the monomer mixture is at a temperature between the melting point of the lowest melting monomer compound and less than the melting point of the diaryl carbonate.

33. A non-reactive monomer mixture consisting of a monomer component dispersed in a melted diaryl carbonate, wherein the monomer component comprises one or more monomer compounds having a melting point below the melting point of the diaryl carbonate and wherein the monomer component comprises less than 600 ppb alkali metal, an acid stabilizer, or both less than 600 ppb alkali metal and an acid stabilizer, wherein the monomer compounds of the monomer component and the diaryl carbonate are present in a mole ratio of from 0.9 to 1.1, and wherein the monomer mixture is at a temperature between the melting temperature of the lowest melting monomer compound and less than 5° C. above the melting point of the diaryl carbonate.

34. The non-reactive monomer mixture of claim 33, wherein the diaryl carbonate comprises BMSC and wherein the monomer component comprises a compound selected from the group consisting of: isosorbide, ethylene glycol, 1,3-Propanediol, 1,2-Propanediol, 1,4-Butanediol, 1,3-Butanediol, 1,5-Pentanediol, 1,6-Hexanediol, 1,7-Heptanediol, 1,10-Decanediol, 1,2-Cyclohexanediol, trans-1,2-Cyclohexanediol, cis-1,2-Cyclohexanediol, 1,4-Cyclohexanedimethanol, $C_{36}$ branched fatty diol, 1,2,6-Hexanetriol, resorcinol, block copolymers based on ethylene oxide and propylene oxide, and ethoxylate polymers.

35. The non-reactive monomer mixture of claim 33, wherein the monomer mixture is at a temperature between the melting point of the lowest melting monomer compound and less than the melting point of the diaryl carbonate.

* * * * *